US012549085B2

United States Patent
Despesse et al.

(10) Patent No.: US 12,549,085 B2
(45) Date of Patent: Feb. 10, 2026

(54) ELECTRONIC DEVICE AND METHOD FOR CONTROLLING AN ELECTRIC ENERGY CONVERTER, RELATED ELECTRONIC CONVERSION SYSTEM AND COMPUTER PROGRAM

(71) Applicant: Commissariat à l'énergie atomique et aux énergies alternatives, Paris (FR)

(72) Inventors: Ghislain Despesse, Grenoble (FR); Thibault Bertin Riviere De La Souchere, Grenoble (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 210 days.

(21) Appl. No.: 18/532,825

(22) Filed: Dec. 7, 2023

(65) Prior Publication Data

US 2024/0213871 A1    Jun. 27, 2024

(30) Foreign Application Priority Data

Dec. 7, 2022   (FR) .................................. FR2212918

(51) Int. Cl.
*H02M 7/493* (2007.01)
*H02J 3/38* (2006.01)
*H02M 1/00* (2006.01)

(52) U.S. Cl.
CPC ........... *H02M 1/0012* (2021.05); *H02J 3/381* (2013.01); *H02M 7/493* (2013.01); *H02J 2300/22* (2020.01)

(58) Field of Classification Search
CPC ..... G05F 1/00; G05F 1/10; G05F 1/12; G05F 1/46; G05F 1/455; G05F 1/45;
(Continued)

(56) References Cited

U.S. PATENT DOCUMENTS

| 2012/0113702 A1* | 5/2012 | Rigbers | H02M 3/335 363/132 |
| 2012/0223584 A1* | 9/2012 | Ledenev | H02J 3/388 307/43 |

(Continued)

FOREIGN PATENT DOCUMENTS

FR    2 976 405    4/2014

OTHER PUBLICATIONS

Search Report dated Apr. 24, 2024 for European Patent Application No. EP 23214212.5, in 15 pages.

(Continued)

*Primary Examiner* — Jeffrey A Gblende
*Assistant Examiner* — Nusrat Quddus
(74) *Attorney, Agent, or Firm* — Knobbe, Martens, Olson & Bear, LLP

(57) ABSTRACT

An electronic control device controls an energy converter delivering a total output voltage and/or an output current from a plurality of elementary DC input voltages, each coming from a respective source of energy. The converter has a number of conversion modules, each receiving an elementary DC input voltage from a respective source and delivering an elementary output voltage. The conversion modules are connected in series by the outputs thereof and the total output voltage is equal to the sum of the elementary output voltages. Each conversion module includes a number of switches for converting the elementary DC input voltage into the respective elementary output voltage. The control device has a number of elementary controllers and a main controller connected to the elementary controllers. Each elementary controller is associated with a respective conversion module and controls the switches of the module.

22 Claims, 12 Drawing Sheets

(58) Field of Classification Search
CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/073; H02M 3/137; H02M 3/28; H02M 3/315; H02M 3/3155; H02M 3/325; H02M 3/335; H02M 7/10; H02M 7/515; H02M 7/521; H02M 7/53; H02M 7/537; H02M 7/5383; H02M 7/538466; H02M 7/53862; H02M 7/5387; H02M 7/53871; H02M 7/53875; H02M 7/757; H02M 7/79; H02M 3/337; H02M 3/338; H02M 3/3382; H02M 3/3384; H02M 7/538; H02M 7/53806; H02M 7/53832; H02M 7/53835; H02M 7/487; H02M 7/539; H02M 7/23; H02M 7/217; H02M 7/21; H02M 7/04; H02M 7/00; H05B 39/048; B23K 11/24; H04B 2215/069

See application file for complete search history.

(56) References Cited

U.S. PATENT DOCUMENTS

| | | | | |
|---|---|---|---|---|
| 2013/0155735 | A1* | 6/2013 | Ilic | H02M 7/5387 363/71 |
| 2013/0181527 | A1* | 7/2013 | Bhowmik | H02J 3/381 307/77 |
| 2015/0016159 | A1* | 1/2015 | Deboy | H02M 7/53873 363/71 |
| 2017/0338651 | A1* | 11/2017 | Fishman | H02M 7/53875 |
| 2018/0183241 | A1* | 6/2018 | Chapman | H02J 3/40 |
| 2020/0083715 | A1* | 3/2020 | Yoscovich | H02J 3/381 |
| 2021/0328496 | A1* | 10/2021 | Sera | H02J 7/0016 |

OTHER PUBLICATIONS

Agarwal et al., Condition monitoring of dc-link capacitor utilizing zero state of solar pv H5 inverter 2016 10th International Conference on Compatibility, Power Electronics and Power Engineering (CPE-Powering), Jun. 29, 2016, pp. 174-179.

Agarwal et al., Quasi-Online Technique for Health Monitoring of Capacitor in Single-Phase Solar Inverter IEEE Transactions on Power Electronics, Institute of Electrical and Electronics Engineers, Jun. 1, 2018, vol. 33, No. 6, pp. 5283-5291.

Cortes et al., Predictive control of a single-phase cascaded h-bridge photovoltaic energy conversion system Power Electronics and motion control conference IPMEC), 2012 $7^{th}$ International, Jun. 2, 2012, pp. 1423-1428.

Harabi et al., Low-Complexity Finite Set Model Predictive Control for Split-Capacitor ANPC Inverter with Different Levels Modes and Online Model update IEEE Journal of Emerging and Selected Topics in Power Electronics, Agut 26, 2022, vol. 11, No. 1, pp. 506-522.

International Search Report dated Jun. 6, 2023 in French Application No. 2212918 in 4 pages.

Li et al., Intermediate Voltage Regulation for Total Harmonic Distortion Reduction of Two-Stage inverters under Model Predictive Control Scheme Via Observers IEE Access, Apr. 25, 2019, vol. 7, pp. 51940-51951.

Liu et al., Leakage Current Supressio of Transformerless 5L-ANPC Inverter with Lower Ripple Model Predictive Control IEEE Transactions on Industry Applications, IEEE Service Center, May 27, 2022, vol. 58, No. 5, pp. 6297-6309.

Pan et al., A Decentralized Control Method for Series Connected PV Battery Hybrid Microgrid 2017 IEEE Transportation Electrification Conference & Expo.

Prabaharan et al., Analysis and integration of multilevel inverter configuration with boost converters in a photovoltaic system Energy Conversion and Management, Elsevier Science Publishers, Oct. 4, 2016, vol. 128, pp. 327-342.

Sally et al., Distributed Maximum Power Point Tracking using Model Predictive Control for Photovoltaic Energy Harvesting Architectures based on Cascaded Power Optimizers IEEE Journal of Photovoltaics, May 1, 2017, vol. 7, No. 3, pp. 849-857.

Zhang, et al., A Grid-Supporting Strategy for Cascaded H-Bridge PV Converter Using VSG Algorithm With Modular Active Power Reserve, IEEE Transactions on Industrial Electronics, vol. 68, No. 1, Jan. 2021.

He, et al., Hybrid Microgrid With Parallel- and Series-Connected Microconverters, IEEE Transactions on Power Electronics, vol. 33, No. 6, Jun. 2018.

* cited by examiner

ELECTRONIC DEVICE AND METHOD FOR CONTROLLING AN ELECTRIC ENERGY CONVERTER, RELATED ELECTRONIC CONVERSION SYSTEM AND COMPUTER PROGRAM

CROSS-REFERENCE TO RELATED APPLICATIONS

This application is a U.S. non-provisional application claiming the benefit of French Application No. 22 12918, filed on Dec. 7, 2022, which is incorporated herein by reference in its entirety.

FIELD

The present invention relates to a device for controlling an electric energy converter.

The energy converter is apt to deliver a total output voltage or current to an output voltage from a plurality of input DC voltages, each voltage coming from a respective source of energy. The energy converter comprises a plurality of energy conversion modules, each being apt to receive as input an elementary DC input voltage from a respective source of energy and to deliver as output an elementary output voltage. The conversion modules are connected in series by the outputs thereof and the total output voltage is equal to the sum of the elementary output voltages, and each conversion module includes a plurality of switches for converting the respective elementary input DC voltage into the respective elementary output voltage.

The electronic control device comprises a plurality of elementary controllers, also called local controllers, and a main controller, also called central controller or master controller, connected to each of the elementary controllers, each elementary controller being associated with a respective conversion module and configured to control the switches of said conversion module.

The main controller is configured to regulate an output variable of the energy converter by sending control commands to the elementary controllers, the regulation being performed based on sets of elementary variable(s), each set of elementary variable(s) being associated with a respective conversion module.

Each elementary controller is configured to regularly measure values of the set of elementary variable(s) for the respective conversion module with which same is associated, and then to transmit same to the main controller, the set of elementary variable(s) including the elementary DC input voltage.

The invention also relates to an electronic electrical energy conversion system apt to convert a plurality of DC input voltages into a total output voltage, the conversion system comprising such an energy converter and such an electronic device for controlling the electric energy converter.

The invention further relates to a method for controlling such an electric energy converter and to a non-transitory computer-readable medium including a computer program including software instructions which, when executed by a computer, implement such a control method.

BACKGROUND

Such an electric energy converter is generally called a multi-level converter, and many articles present solutions for controlling such multi-level converters.

Among the articles, the article "*A Decentralized Control Method for Series Connected PV Battery Hybrid Microgrid*" by Y. Pan et al (2017) relates to the energy management of a multi-level, multi-source of energy inverter connected to the grid. Two types of sources are used: solar panels and batteries. The goal of the article is to present a method for managing the production of energy of the panels and for managing the charging/discharging of the batteries. Each level consists of a source of energy (solar panel or battery), as well as a direct current/alternating current (DC/AC) conversion module. The DC/AC conversion module has a decoupling capacitor at the source, an H-bridge for producing an AC voltage from a DC source, and an output filter. The H-bridge is controlled by an elementary controller, called a local controller. Each local controller receives active and reactive power generation instructions from a single main controller, called the central controller. On the other hand, the elementary controllers send data relating to the source of energy (state of charge of the batteries, voltages of the solar panels). Such data are sent over a low-speed communication bus. Thereby, the main controller controls each solar panel around the maximum power point thereof, regulates the state of charge of the batteries and produces a regulated sinusoidal current on the power grid.

However, such a control device is expensive and complex. Indeed, each elementary controller requires four measurements from four sensors, three of which measure alternating differential data (two currents and one voltage). Moreover, the switching of the energy conversion modules are not coordinated with each other (since the local controller receives just a setpoint and not a switching command, same executes many switchings in order to follow the setpoint thereof independently of the other modules), not reducing a shared filter on the overall output, but requiring an efficient output filter at each module (more expensive and bulky and a high number of cumulative switches on all modules increasing the overall losses).

The energy converter and the control device presented in the article "*Hybrid Microgrid with Parallel-and Series-Connected Microisolated*" by J. He et al (2018) continue the work of Y. Pan et al (described in the aforementioned article) in the same laboratory (Tianjin University, Tianjin, China). The article focuses on the parallelization of multi-level inverters in order to improve redundancy at the production of energy.

However, again, elementary controllers are complex circuits (high-performance microcontroller, as well as many expensive sensors) which limit the use thereof, in particular if the number of conversion modules is high, typically greater than 5. Likewise, the switching is not coordinated: more switching leading to more losses and to an accumulation of bulky and costly output filters compared with switching coordinated at the overall level.

The article "A Grid-Supporting Strategy for Cascaded H-Bridge PV Converter Using VSG Algorithm with Modular Active Power Reserve" by X. Zhang et al. (2021) further relates to the control of a multi-level inverter, herein solar and without batteries. The article highlights the relevance of the converter in playing a support role for the electricity grid due to a VSG (Virtual Synchronous Generator) operation.

However, the converter described in said article includes only five conversion modules and has a low operating frequency of 2.5 kHz.

SUMMARY

The goal of the invention is then to propose a device for controlling such a multi-level energy converter leading to a high frequency control, typically greater than 20 kHz, of said converter which can also be connected to a large number of sources of energy, e.g. to more than ten sources of energy, while reducing the complexity of the control device, as well as the size and volume of the output filtering elements.

To this end, the subject matter of the invention is an electronic control device of the aforementioned type, wherein the main controller comprises a first estimator configured to calculate, for each conversion module, an estimated value of the elementary DC input voltage from a previously measured value of the elementary DC input voltage.

With the electronic control device according to the invention, the first estimator then makes it possible to operate the energy converter at a switching frequency $f_{sw}$ higher than the refresh frequency $f_D$ of a data link, such as a data bus, connecting the main controller to the elementary controllers, without reducing the stability and the accuracy of the regulation of each elementary DC input voltage. It should be noted that the higher the switching frequency $f_{sw}$, the more compact the output filter is. According to the invention, the switching of the modules is coordinated at the level of the main controller, which switches only a minimum number of modules at the switching frequency $f_{sw}$. On the other hand, in the prior art described hereinabove, all modules switch at high frequencies leading to losses without limiting the ripple of the output current since the switching of each elementary output is managed in a non-coordinated manner. If, for a given current or voltage ripple, the elementary output filter is also smaller as the frequency is higher, at the same current or voltage ripple and at the same switching frequency, the filter is in all cases more bulky than within the framework of the invention where the switching is coordinated.

A critical point the invention addresses is to be able to determine, at the main controller, each switching of each module (and not to calculate just a setpoint) while having access to data measured on the modules at a refresh frequency $f_D$ lower than the switching frequency $f_{SW}$. And thereby to perform coordinated switching without requiring very high speed means of measurement and of communication.

Advantageously, as an optional supplement, the second estimator also makes possible the operation of the energy converter at the switching frequency $f_{sw}$ greater than the refresh frequency $f_D$, while maintaining the stability and the accuracy in the regulation of each elementary input current, then of the total output current resulting therefrom.

Furthermore, the first estimator, and advantageously the second estimator, make it possible to limit the number of sensors necessary at the conversion modules or of the elementary controllers, since the control device requires only voltage sensors apt to measure the elementary DC input voltages, i.e. typically one voltage sensor per conversion module.

According to other advantageous aspects of the invention, the electronic control device comprises one or a plurality of the following features, taken individually or according to all technically possible combinations:
each conversion module comprises two input terminals, two output terminals, a switching bridge with a plurality of switching branches, each connected between the two input terminals and including a plurality of switches connected in series and connected to each other at a midpoint connected to a corresponding output terminal, each conversion module further comprising a capacitor connected between the input terminals, in parallel with the switching bridge;
the first estimator is configured to calculate, for each conversion module, the estimated value of the elementary DC input voltage based on the previously measured value of the elementary DC input voltage, the capacitance of the capacitor and a value of the current flowing through said capacitor;
the value of the current flowing through said capacitor is preferentially obtained by the difference between a value of an input elementary current received by the conversion module and a value of a bridge current received by the switching bridge;
the first estimator is configured to calculate, for each conversion module, the estimated value of the elementary DC input voltage according to the following equation:

$$\widehat{V_{PV_i}}(t_k) = V_{PV_i}(t_{k-1}) + \left(I_{PV_i}(t_k) - I_{H_i\_M}(t_k)\right) \cdot \frac{t_k - t_{k-1}}{C_{PV_i}}$$

where $\widehat{V_{PV_i}}(t_k)$ is the estimated value of the elementary DC input voltage,
$V_{PVi}(t_{k-1})$ is a preceding value of the elementary DC input voltage,
$I_{PVi}(t_k)$ is the value of the input elementary current,
$t_k$, and $t_{k-1}$, respectively represent current and preceding instants respectively,
$C_{PVi}$ is the capacitance of the capacitor,
$I_{Hi\_M}(t_k)$ represents the average value of the bridge current between the instants $t_{k-1}$ and $t_k$;
the preceding value $V_{PVi}(t_{k-1})$ of the elementary DC input voltage being the previously measured value of the elementary DC input voltage if same was measured for the preceding instant, or the preceding estimated value of the elementary DC input voltage if said previously measured value was measured for an instant prior to the preceding instant;
said average value $I_{Hi\_M}(t_k)$ of the bridge current preferentially satisfying the following equation:

$$I_{H_i\_M}(t_k) = \frac{1}{t_k - t_{k-1}} \int_{t_{k-1}}^{t_k} I_{H_i}(t) \cdot dt$$

the main controller further includes a second estimator configured to calculate, for each conversion module, an estimated average of the input elementary current received by the conversion module, the estimated value of the input elementary current being then used for calculating the estimated value of the elementary DC input voltage;
the second estimator is configured to calculate, for each conversion module, the estimated average of the elementary input current over a period of averaging, as a function of the total output voltage and an output current delivered at the output of the energy converter, and an average value of the elementary DC input voltage over the period of averaging;
the period of averaging depending preferentially on half-period of the output voltage;
the second estimator is configured to calculate, for each conversion module, the estimated average of the input elementary current according to the following equation:

$$\langle I_{PV_i} \rangle = \frac{1}{T_g} \cdot \frac{\int_{t_0}^{t_0+T_g} V_S(t) \cdot I_S(t) \cdot |K_i(t)|\, dt}{\langle V_{PV_i} \rangle}$$

Where $\langle I_{PV_i} \rangle$ is the estimated average of the input elementary current, $T_g$ represents the period of averaging, $V_S$ is the total output voltage, $I_S$ is the output current, $\langle V_{PV_i} \rangle$ represents the average value of the elementary DC input voltage over said period of averaging, and $K_i$ represents a connection coefficient, $K_i$ being equal to 0 when no source of energy is connected to the input of the corresponding conversion module and different from 0 when at least one source of energy is connected to the input of the corresponding conversion module;

the period of averaging being preferentially a multiple of the half-period of the output voltage, said multiple being an integer greater than or equal to 1;

the main controller further includes a third estimator configured to calculate, for each conversion module, an estimated value of the capacitance of the capacitor;

the third estimator is configured to estimate a current value of the capacitance of the capacitor by correcting a preceding estimated value of the capacitance of the capacitor according, on one hand, to the sign of the difference between a value of a bridge current received by the switching bridge and a value of an input elementary current received by the conversion module, called the first sign, and, on the other hand, to the sign of the difference between the estimated value of the elementary DC input voltage and the subsequently measured value of the elementary DC input voltage, called the second sign; an initial estimated value of the capacitance of the capacitor being predefined;

if the first and second signs are identical, the estimated current value of the capacitance of the capacitor is preferentially equal to the preceding estimated value of the capacitance of the capacitor reduced by one correction step;

if the first and second signs are distinct, the estimated current value of the capacitance of the capacitor is preferentially equal to the preceding estimated value of the capacitance of the capacitor increased by the correction step;

the correction step is preferentially on the order of one percent of the initial value of the capacitance of the capacitor;

each source of energy comprises at least one element chosen from: a photovoltaic unit, an electric battery and a supercapacitor;

each source of energy includes P pair(s) of photovoltaic units, the photovoltaic units of a respective pair being connected in cascade, P being an integer greater than or equal to 1;

if P is strictly greater than 1, the pairs of photovoltaic units preferentially being connected in cascade.

each conversion module comprises Q capacitors, where Q, equal to twice the number P, represents the number of photovoltaic units for the source of energy associated with the conversion module, each capacitor being apt to be connected in parallel with a respective photovoltaic unit, Q capacitors having substantially the same capacitance, and wherein when the connection coefficient is non-zero, the value thereof is a multiple of 1/Q, the multiple being a relative integer the value of which depends on a connection configuration of the photovoltaic units and of a connection state of each of the photovoltaic units, each connection state being among connected and disconnected.

A further subject matter of the invention relates to an electronic conversion system for electrical energy apt to convert one or a plurality of input voltages into one or a plurality of output voltages, the conversion system comprising:

an energy converter apt to deliver the total output voltage and/or output current from the plurality of input DC voltages, each coming from a respective source of energy; the energy converter comprising a plurality of energy conversion modules, each being apt to receive as input an elementary DC input voltage from a respective source of energy and of delivering an elementary output voltage; the converter modules being connected in series by the outputs thereof and the total output voltage being equal to the sum of the elementary output voltages; each converter module including a plurality of switches for converting the respective elementary input DC voltage into the respective elementary output voltage, an electronic control device for each electric energy converter, the electronic control device being as defined hereinabove.

A further subject matter of the invention is a method for controlling an electric energy converter, the energy converter being apt to deliver a total output voltage and/or an output current from the plurality of input DC voltages, referred to as elementary input DC voltages, each coming from a respective source of energy; the energy converter comprising a plurality of energy conversion modules, each being apt to receive as input an elementary DC input voltage from a respective source of energy and of delivering an elementary output voltage; the converter modules being connected in series by the outputs thereof and the total output voltage being equal to the sum of the elementary output voltages; each converter module including a plurality of switches for converting the respective elementary input DC voltage into the respective elementary output voltage, the control method being implemented by a main controller connected to each of a plurality of elementary controllers, each elementary controller being associated with a respective conversion module and configured to control the switches of said conversion module, the method comprising:

regulating an output variable of the energy converter by sending control commands to the elementary controllers, the regulation being carried out according to sets of elementary variable(s), each set of elementary variable(s) being associated with a respective conversion module, each elementary controller regularly measuring values of the set of elementary variable(s) for the respective conversion module with which same is associated and then transmitting same to the main controller, the set of elementary variable(s) including the elementary DC input voltage, calculating, for each conversion module, an estimated value of the elementary DC input voltage from a previously measured value of the elementary DC input voltage.

The invention further relates to a non-transitory computer-readable medium including a computer program including software instructions which, when executed by a computer, implement a control method as defined hereinabove.

BRIEF DESCRIPTION OF THE DRAWINGS

Such features and advantages of the invention will become clearer upon reading the following description, given only as a non-limiting example, and made with reference to the enclosed drawings, wherein.

DETAILED DESCRIPTION

In the present description, the expression "on the order of" "substantially equal to" refer to a relation of equality within plus or minus 10%, preferentially within plus or minus 20%, preferentially within plus or minus 5%.

Figure 1:
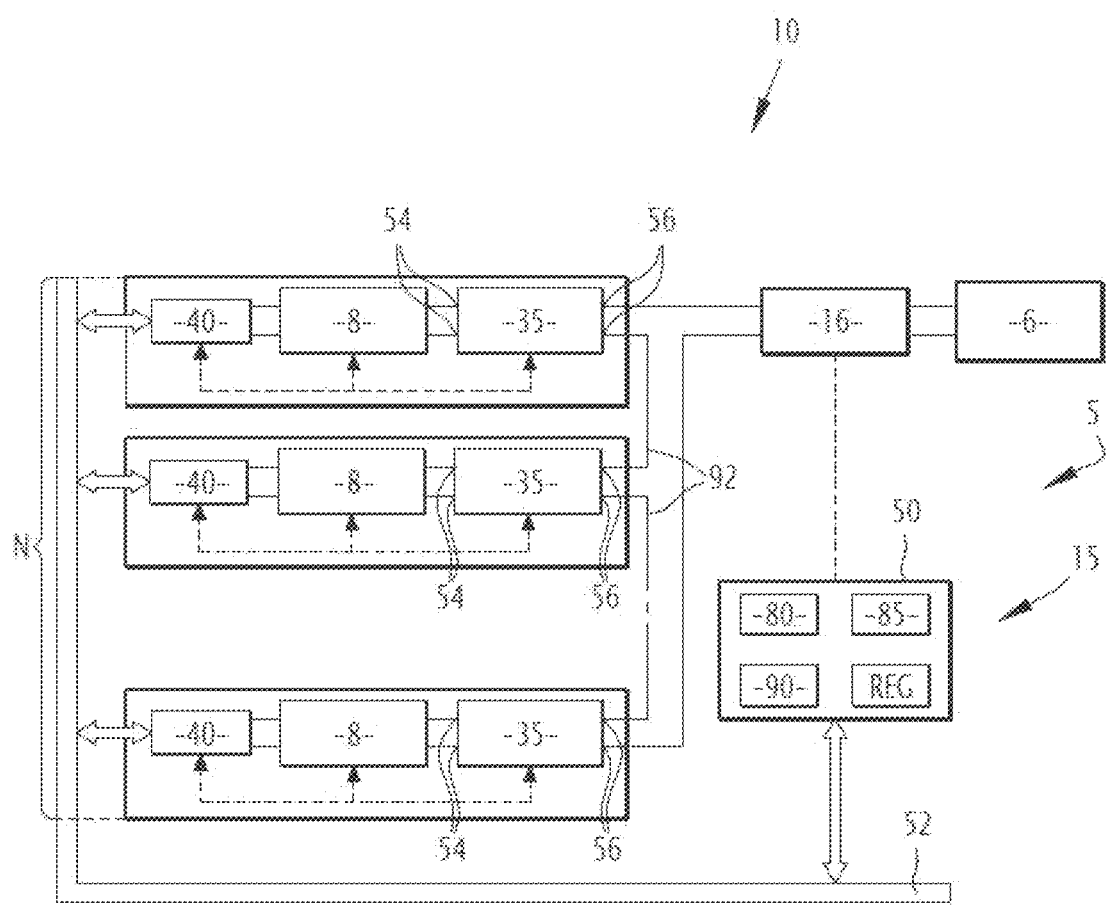
FIG. 1 is a schematic representation of an electronic system for converting electrical energy according to the invention, the conversion system comprising an energy converter apt to deliver a total output voltage from a plurality of input DC voltages and an electronic device for controlling the electric energy converter, each input DC voltage coming from a respective source of energy; the converter including a plurality of energy conversion modules, each apt to receive as input an elementary DC input voltage from a respective source of energy and to output an elementary output voltage, each conversion module including a plurality of switches for converting the respective elementary DC input voltage into the respective output elementary voltage; the electronic control device including a plurality of elementary controllers and a main controller connected to each of the elementary controllers, each elementary controller being associated with a respective conversion module and configured to control the switches of said conversion module.

In FIG. 1, an electronic electrical energy conversion system 5, called hereinafter a conversion system, is connected to an electrical grid 6, in particular for supplying same with electrical energy from sources of energy 8.

The conversion system 5 is apt to convert a plurality of input DC voltages $V_{PV1}$, $V_{PV2}$, ..., $V_{PVN}$, also called elementary input DC voltages $V_{PV1}$, $V_{PV2}$, ..., $V_{PVN}$, each coming from a respective source of energy 8, at a total output voltage $V_S$, typically delivered to the electrical grid 6, if appropriate via a filter 16.

The conversion system 5 comprises an energy converter 10 apt to deliver the total output voltage $V_S$ from the plurality of DC input voltages $V_{PV1}$, $V_{PV2}$, ..., $V_{PVN}$ and an electronic device 15 for controlling the electric energy converter 10.

As an optional supplement, the conversion system 5 comprises a filter 16. The output voltage of the filter 16 supplies at the output thereof a load (not shown), or is directly connected to the electrical grid 6, or else recharges a battery (not shown). In the example shown in FIG. 2, the filter 16 is directly connected to the electrical grid 6, and the filter 16 is then connected between the energy converter 10 and the electrical grid 6. In a variant, the output filter 16 is distributed in whole or in part along the power path, e.g. at the level of each of the energy conversion modules 35, described thereafter and included in the energy converter 10.

Figure 2:
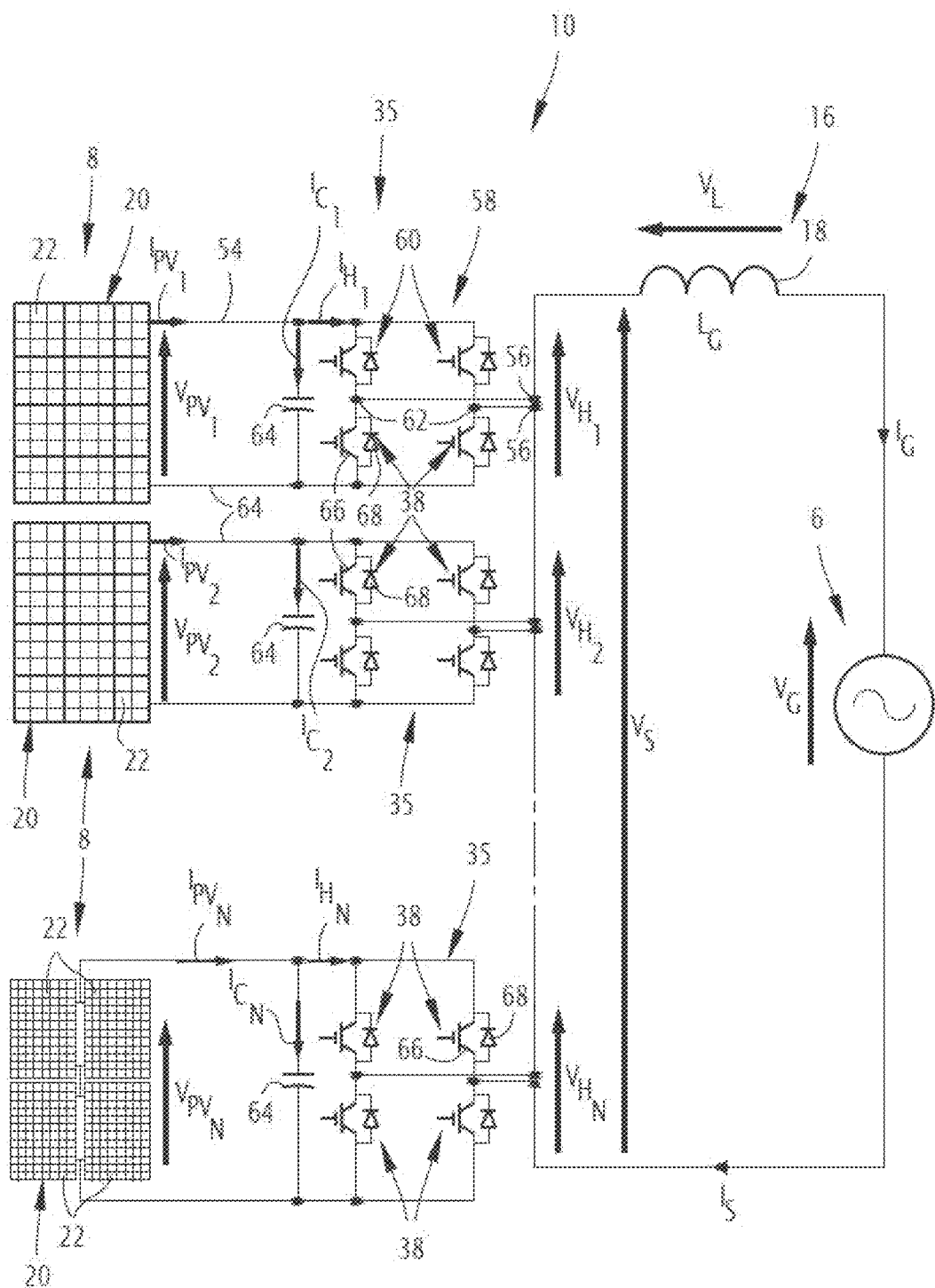
FIG. 2 is a simplified electrical diagram of the energy converter included in the conversion system shown in FIG. 1, the conversion modules being connected in series by the outputs thereof and the total output voltage being equal to the sum of the elementary output voltages.

In the example shown in FIG. 2, the filter 16 is an L filter and includes an electromagnetic coil 18, also called a filtering inductance, the electromagnetic coil 18 having an inductance $L_G$. The voltage across the filter 16, and more particularly of the filtering inductance 18, is denoted by $V_L$.

In a variant (not shown), the filter 16 is an LC filter, and then includes an electromagnetic coil, or filtering inductance, coupled to a filtering capacitor. In a further variant, the filter 16 is an LCL filter, and then includes two electromagnetic coils, or filtering inductances, coupled to a filtering capacitor.

The electrical grid 6 is an alternating electrical grid, as in the example shown in FIG. 2, or, in a variant, a direct current electrical grid. The electrical grid 6 has a voltage $V_G$ and a current $I_G$.

Each source of energy 8 comprises at least one element chosen from: a photovoltaic unit 20, an electric battery and a supercapacitor (not shown).

Figure 3:
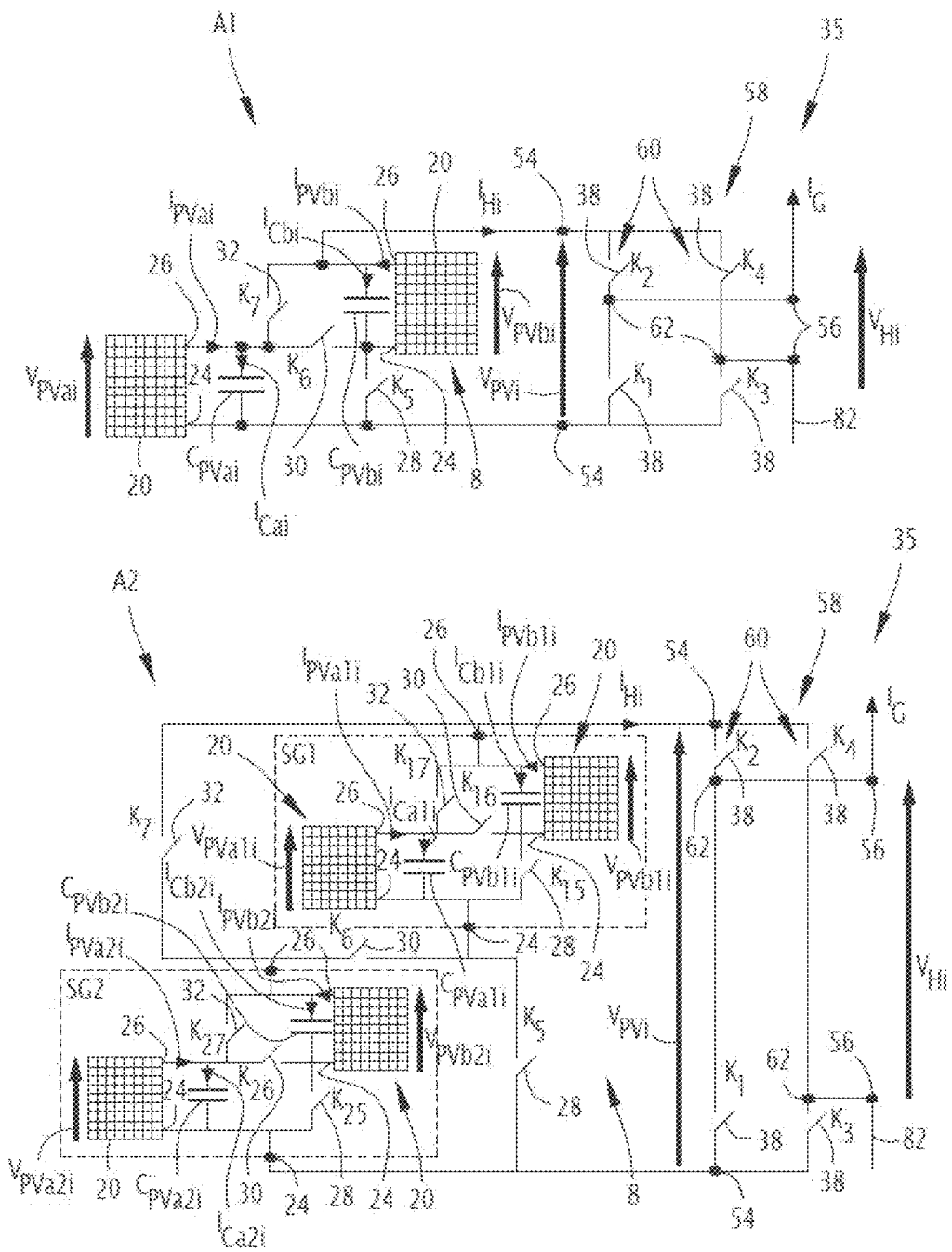
FIG. 3 is a simplified electrical diagram showing other examples than the examples shown in FIG. 2, of photovoltaic sources of energy containing blocks and the associated conversion modules.

In the examples shown in FIGS. 2 and 3, each source of energy 8 is formed by one or a plurality of photovoltaic units 20.

A "photovoltaic unit" refers to a set of one or a plurality of photovoltaic cells. In practice, a photovoltaic panel 22 contains many photovoltaic cells. A photovoltaic cell is generally configured to deliver a voltage comprised between 0.4 V and 0.6 V, whereas the photovoltaic panel 22 is typically configured to deliver a voltage on the order of several tens of volts. Furthermore, it is possible to make sub-groups of photovoltaic cells within the same photovoltaic panel 22, and thereby to have an individualized management of the sub-groups of photovoltaic cells. The skilled person would then understand that a photovoltaic unit 20 could consist of a portion of a photovoltaic panel 22, i.e. by one or a plurality of subgroups of photovoltaic cells; by a photovoltaic panel 22, or by a plurality of photovoltaic panels 22.

In the example shown in FIG. 2, each source of energy 8 is formed by a single photovoltaic unit 20. In such example, the photovoltaic unit 20 of certain sources of energy 8, such as the first two sources of energy having the elementary DC input voltages $V_{PV1}$, $V_{PV2}$, consists of a photovoltaic panel 22, and the photovoltaic unit 20 of other sources of energy 8 consists of a plurality of photovoltaic panels 22, the one associated with the last elementary DC input voltage source of energy $V_{PVN}$ consisting e.g. of four photovoltaic panels 22, in the form of a series connection of two groups of two photovoltaic panels 22 in parallel.

In a variant, in the example shown in FIG. 3, each source of energy 8 includes P pair(s) of photovoltaic units 20, the photovoltaic units 20 of a respective pair being connected in cascade, P being an integer greater than or equal to 1.

According to a first arrangement A1 shown in the upper part of FIG. 3, the source of energy 8 includes only one pair of photovoltaic units 20.

According to a second arrangement A2 shown in the lower part of FIG. 3, the source of energy 8 includes a plurality of pairs of photovoltaic units 20, more particularly two pairs in the present example, and the pairs of photovoltaic units 20 are as such connected in cascade.

Each photovoltaic unit 20 includes two connection terminals 24, 26, namely a first connection terminal 24 and a second connection terminal 26; and for the cascade connection of the two photovoltaic units 20 of a respective pair, the first terminals 24 of the two blocks are connected to each other via a first switch 28, such as the switch $K_5$ in the first arrangement A1, the first terminal 24 of one block being connected to the second terminal 26 of the other block via a second switch 30, such as the switch $K_6$ in the first arrangement A1, and the second terminals 26 of the two blocks being connected to each other via a third switch 32, such as the switch $K_7$ in the first arrangement A1.

According to the second arrangement A2, a first pair of photovoltaic units 20 is referenced by SG1, and a second pair of photovoltaic units 20 is referenced by SG2. In the present example, for the first pair SG1, the first switch 28 connecting the first terminals 24 of the two units is denoted by $K_{15}$, the second switch 30 connecting the first terminal 24 of one unit is connected to the second terminal 26 of the other unit is denoted by $K_{16}$, and the third switch 32 connecting the second terminals 26 of the two units of said first pair SG1 is denoted by $K_{17}$. For the second pair SG1, the first switch 28 connecting the first terminals 24 of the two units is denoted by $K_{25}$, the second switch 30 connecting the first terminal 24 of one unit is connected to the second terminal 26 of the other unit is denoted by $K_{26}$, and the third switch 32 connecting the second terminals 26 of the two units of said first pair SG1 is denoted by $K_{27}$.

Furthermore, according to the second arrangement A2, the two pairs SG1, SG2 of photovoltaic units 20 are as such connected in cascade. By analogy with the cascade connection of two photovoltaic units 20 described hereinabove, each pair SG1, SG2 of photovoltaic units includes as such two connection terminals 24, 26, namely a first connection terminal 24 and a second connection terminal 26; and for the cascade connection of the two pairs SG1, SG2, the first terminals 24 of the two pairs SG1, SG2 are connected to each other via the first switch 28, such as the switch $K_5$ in the second arrangement A2, the first terminal 24 of the pair SG1 being connected to the second terminal 26 of the pair SG2 via the second switch 30, such as the switch $K_6$ in the second arrangement A2, and the second terminals 26 of the two pairs SG1, SG2 being connected to each other via the third switch 32, such as the switch $K_7$ in the second arrangement A2.

The skilled person would understand that the principle of cascade connection can be generalized and applied in the same way to two batches of two pairs of photovoltaic units 20, in order to obtain two batches connected in cascade, with the said two batches including in total eight cascaded photovoltaic units 20 and so on.

The energy converter 10 comprises a plurality of energy conversion modules 35, each apt to receive at the input thereof an elementary DC input voltage $V_{PV1}$, $V_{PV2}$, ..., $V_{PVN}$ from a respective source of energy 8 and to deliver as output an elementary output voltage $V_{H1}$, $V_{H2}$, ..., $V_{HN}$. The elementary DC input voltage is generally denoted by $V_{PVi}$, and the output elementary voltage is generally denoted by $V_{Hi}$, with i being an integer comprised between 1 and N, where N is the number of energy conversion modules 35, as illustrated in the examples shown in FIGS. 2 and 3. The conversion modules 35 are connected in series by the outputs thereof and the total output voltage $V_S$ is then equal to the sum of the elementary output voltages $V_{H1}$, $V_{H2}$, ..., $V_{HN}$. Each conversion module 35 includes a plurality of switches 38 for converting the respective elementary input DC voltage into the respective elementary output voltage.

The energy converter 10 then has e.g. a CHBM (Cascaded H-Bridge Multilevel Inverter) topology.

When the electrical grid 6 is an alternating current electrical grid, as in the example shown in FIG. 2 and in the example of FIG. 3, the energy converter 10 is then a DC-AC converter, also denoted DC-AC, configured to convert the plurality of elementary input DC voltages $V_{PV1}$, $V_{PV2}$, ..., $V_{PVN}$ into the total output voltage $V_S$, which is then an AC voltage. Each energy conversion module 35 is then also a DC-AC conversion module configured to convert each respective elementary input DC voltage $V_{PVi}$ into the respective elementary output voltage $V_{Hi}$ which is then an AC voltage.

In a variant, when the electrical grid 6 is a DC electrical grid, the energy converter 10 is then a DC-DC converter configured to convert the plurality of elementary input DC voltages $V_{PV1}$, $V_{PV2}$, ..., $V_{PVN}$ into the total output voltage $V_S$, which is then a DC voltage. Each energy conversion module 35 is then also a DC-DC conversion module configured to convert each respective elementary input DC voltage $V_{PVi}$ into the respective elementary output voltage, $V_{Hi}$ which is then a DC voltage.

The electronic control device 15 comprises a plurality of elementary controllers 40 and a main controller 50 connected to each of the elementary controllers 40. In the example shown in FIGS. 1 and 4, the main controller 50 is connected to the elementary controllers 40 via a data bus 52. In other words, the main controller 50 and each of the elementary controllers 40 are connected to the data bus 52. In a variant (not shown), each elementary controller 40 is connected to the main controller 50 via a point-to-point connection, also referred to as a point-to-point link.

In the examples shown in FIGS. 2 and 3, each conversion module 35 comprises two input terminals 54, two output terminals 56, a switching bridge 58 with a plurality of switching branches 60, each connected between the two input terminals 54 and including a plurality of switches 38 connected in series and connected to each other at a midpoint 62 connected to a corresponding output terminal 56.

In addition, each conversion module 35 further comprises a capacitor 64 connected between the input terminals 54, in parallel with the switching bridge 58.

In the examples shown in FIGS. 2 and 3, the switching bridge 58 is an H-bridge, and then includes two switching branches 60, as is known per se. Each switching branch 60 typically includes two switches 38 connected in series, and the switching bridge 58 then includes four switches 38, also denoted by $K_1$, $K_2$, $K_3$, $K_4$, as shown in FIG. 3.

In the example shown in FIG. 3, when each source of energy 8 includes P pair(s) of photovoltaic units 20, each conversion module 35 comprises Q capacitors 64, where Q, equal to twice the number P, represents the number of photovoltaic units 20 for the source of energy 8 associated with the conversion module 35, each capacitor 64 being apt to be connected in parallel with a respective photovoltaic unit 20. In such example, the Q capacitors 64 advantageously have a substantially identical capacitance.

Each switch 38 is preferentially a bidirectional voltage switch. Each switch 38 includes e.g. a transistor 66 and a diode 68 connected in antiparallel with the transistor 66, as shown in FIG. 2. The transistor 66 is e.g. an insulated gate field effect transistor, also called MOSFET (Metal Oxide Semiconductor Field Effect Transistor). In a variant, the transistor 66 is a bipolar transistor; an insulated gate bipolar transistor, also called IGBT (Insulated Gate Bipolar Transistor); a silicon (Si) transistor, a GaN (Gallium Nitride) transistor; a silicon carbide (SiC) transistor, a diamond transistor, or a thyristor or further mechanical switch such as micro-switch such as a MEMS (MicroElectroMechanical System). Similarly, the first, second and third switches 28, 30, 32 further include a transistor and a diode (not shown) connected in antiparallel to the transistor. The transistor of each of the first, second and third switches 28, 30, 32 is according to one of the examples described hereinabove for the transistor 66, and e.g. of the same type as the switch of the transistor 66.

Each elementary controller 40 is associated with a respective conversion module 35, and is configured to control the switches 38 of said conversion module 35.

Each elementary controller 40 is configured to regularly measure values of a set of elementary variable(s) for the respective conversion module 35 with which the controller is associated, then to transmit same to the main controller 50.

The set of elementary variable(s) includes the respective elementary DC input voltage $V_{PVi}$. The regular measurement of the respective elementary DC input voltage $V_{PVi}$ is carried out via a voltage sensor, not shown, for each respective conversion module 35, each voltage sensor being connected to the corresponding elementary controller 40.

As an optional supplement, the set of elementary variable(s) include a respective elementary DC input current $I_{PVi}$, coming from the corresponding source of energy 8. According to such optional supplement, the regular measurement of the respective elementary DC input current $I_{PVi}$ then requires the presence of a current sensor (not shown), for each respective conversion module 35, each current sensor being connected to the corresponding elementary controller 40.

Each elementary controller 40 typically includes a control unit 70 configured to control the switching bridge 58 by controlling the switches 38. As an optional supplement, each elementary controller 40 comprises a determination unit 72 configured to determine an optimum voltage $V_{opt\_i}$ associated with the respective conversion module 35. The determination unit 72 is typically configured to determine said optimum voltage $V_{opt\_i}$ via the implementation of an algorithm for tracking the maximum power point, also called MPPT (Maximum Power Point Tracking) algorithm.

Each elementary controller 40 further includes a receiver 74 and a transmitter 76, each compatible with the communication protocol of the data bus 52. In other words, the receiver 74 is apt to receive data from the main controller 50 via the data bus 52, in particular, a connection coefficient $K_i$ indicating whether or not it is necessary to connect the respective source of energy 8 to the corresponding conversion module 35 in order to then deliver the respective elementary output voltage $V_{Hi}$. The transmitter 76 is apt to regularly transmit data to the main controller 50 via said bus 52, in particular a measured value of the respective elementary DC input voltage $V_{PVi}$, the value of the optimum voltage $V_{opt\_i}$, or a measured value of the respective elementary DC input current $I_{PVi}$.

The main controller 50 is configured to regulate an output variable of the energy converter 10 by sending control commands to the elementary controllers 40, the regulation being carried out based on the sets of elementary variable(s), each set of elementary variable(s) being associated with a respective conversion module 35.

The output variable of the energy converter 10 which is regulated by the main controller 50 is typically the output voltage $V_S$ or an output current $I_S$ of the energy converter 10. If the energy converter 10 is connected to a load imposing the voltage, such as e.g. the electrical grid 6, then the regulated variable, i.e. the variable to be controlled, is the output current $I_S$. On the other hand, if the energy converter 10 is connected to a load imposing the current, e.g. a motor or a battery charger, then the variable to be controlled is the output voltage $V_S$.

Figure 4:
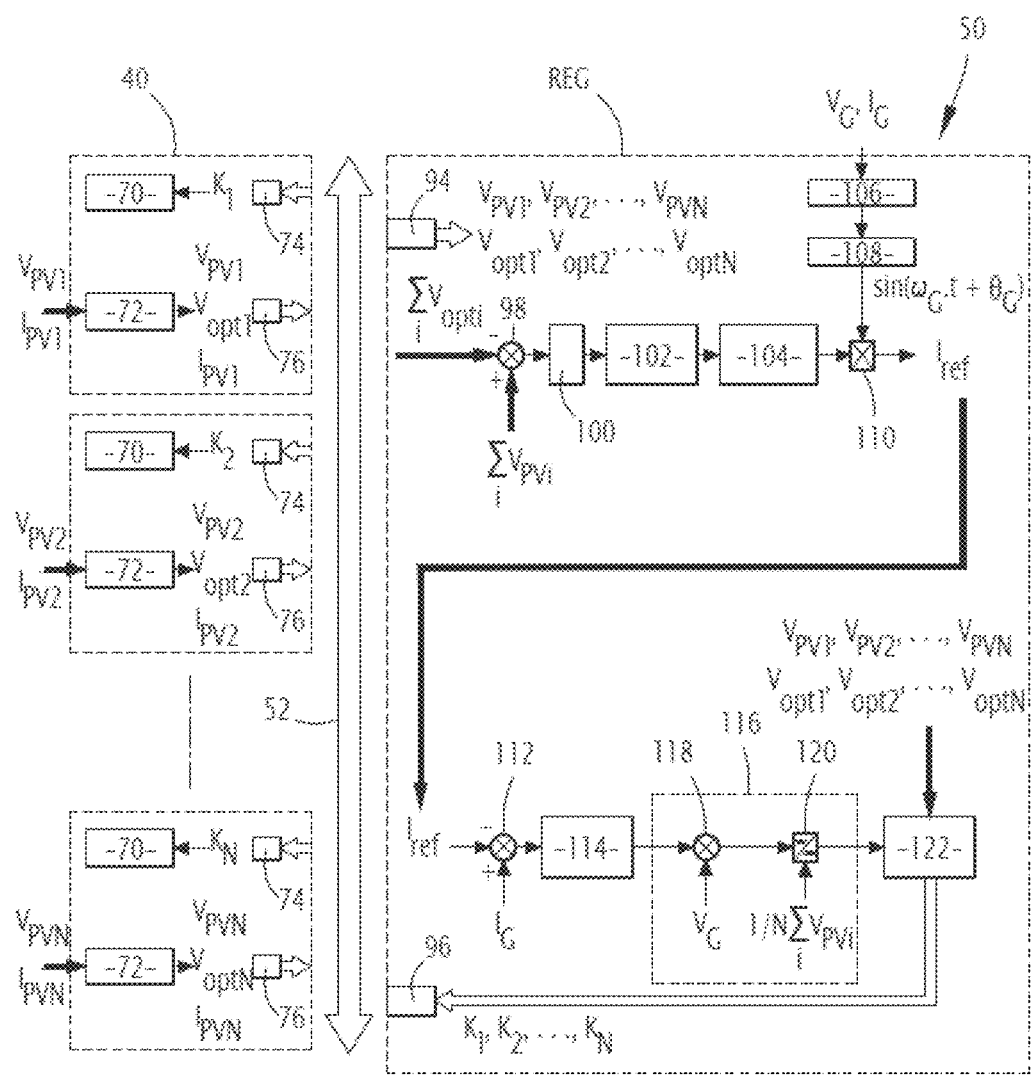
FIG. 4 is a more detailed schematic representation of each of the elementary controllers, of a control unit included in the main controller, and of the parameters and variables exchanged between the main controller and the elementary controllers.

The regulation performed by the main controller 50 is implemented within a regulation unit REG, described in greater detail thereafter with reference to FIG. 4.

According to the invention, the main controller 50 comprises a first estimator 80, visible in FIG. 1, configured to calculate, for each conversion module 35, an estimated value $\widehat{V_{PV_i}}(t_k)$ of the elementary DC input voltage $V_{PVi}$ from a previously measured value $V_{PVi}(t_{k-p})$ of the elementary DC input voltage $V_{PVi}$.

As an optional supplement, the main controller 50 further includes a second estimator 85 configured to calculate, for each conversion module 35, an estimated average $<I_{PVi}>$ of the input elementary current $I_{PVi}$ received by the conversion module 35, the estimated average value $<I_{PVi}>$ of the elementary input current $I_{PVi}$ then being used for calculating the estimated value $\widehat{V_{PV_i}}(t_k)$ of the elementary DC input voltage $V_{PVi}$.

According to such optional supplement, due to the estimation of the elementary input current $I_{PVi}$ via the second estimator 85, it is not necessary to measure the respective elementary input current $I_{PVi}$, which then avoids the addition of a current sensor for each respective conversion module 35. According to such optional supplement, the set of elementary variable(s), measured regularly for each elementary controller 40, then includes only the respective elementary DC input voltage $V_{PVi}$.

As an optional supplement, the main controller 50 further includes a third estimator 90 configured to calculate, for each conversion module 35, an estimated value $\widehat{C_{PV_i}}$ of the capacitance $C_{PVi}$ of the capacitor 64.

In the example shown in FIG. 1, the first estimator 80 and, as an optional addition, the second estimator 85 and the third estimator 90 are each produced in the form of a programmable logic component, such as an FPGA (Field Programmable Gate Array), or further of integrated circuit, such as an ASIC (Application Specific Integrated Circuit).

In a variant, the main controller 50 comprises an information processing unit consisting e.g. of a memory and of a processor (not shown) associated with the memory.

According to such variant, the first estimator 80, and, as an optional supplement, the second estimator 85 and the third estimator 90, are each produced in the form of a software program, or a software brick, which can be run by the processor. The memory of the main controller 50 is then apt to store a first estimation software apt to calculate, for each conversion module 35, the estimated value $\widehat{V_{PV_i}}(t_k)$ of the elementary DC input voltage $V_{PVi}$ from the measured value $V_{PVi}(t_{k-p})$ of the elementary DC input voltage $V_{PVi}$. As an optional supplement, the memory of the main controller 50 is then apt to store a second estimation software apt to calculate, for each conversion module 35, the estimated average $<I_{PVi}>$ of the input elementary current $I_{PVi}$ received by the conversion module 35, and a third estimation software apt to calculate, for each conversion module 35, the estimated value $\widehat{C_{PV_t}}$ of the capacitance $C_{PVi}$ of the capacitor 64. The processor of the main controller 50 is then apt to execute each of the software programs among the first estimation software, and, as an optional supplement, the second estimation software and the third estimation software. The skilled person could further understand that when executed by said processor, the first estimation software, and, as an optional supplement, the second estimation software and the third estimation software, then form the first estimator 80, the second estimator 85 and the third estimator 90, respectively.

When the main controller 50 is produced in the form of one or a plurality of software programs, i.e. in the form of a computer program, also called a computer program product, same is further apt to be recorded on a computer-readable medium (not shown). The computer-readable medium is e.g. a medium apt to store the electronic instructions and to be coupled to a bus of a computer system. As an example, the readable medium is an optical disk, a magneto-optical disk, a ROM memory, a RAM memory, any type of non-volatile memory (e.g. EPROM, EEPROM, FLASH, NVRAM), a magnetic card or an optical card. A computer program containing software instructions is then stored on the readable medium.

The data bus 52, also called a communication bus, is e.g. an RS-485 bus, the RS-485 standard being also known as EIA-485; a USB (Universal series Bus) bus, an UART (Universal Asynchronous Receiver Transmitter) bus, or a CAN (Controller Area grid) bus, standardized with the standard ISO 11898. The communication bus 52 then has a limited speed, in particular for reasons of reliability. Within the framework of a conversion system 5 with a significant number of conversion modules 35, typically more than five conversion modules 35, the quantity of data to be retrieved in real time by the communication bus 52 could be considerable. Thereby, the operating frequency of the energy converter 10 may be limited by the period of data acquisition.

For the CHBMLI topology, the conversion modules 35 are advantageously connected to the back of the photovoltaic panels 22 so as to limit the length of an electric cable 92, also called a power cable, connecting the outputs of the conversion modules 35 in series with each other, i.e. one after the other. Thereby, the communication bus 52 travels the length of the surface of the photovoltaic panels 22 (up to 20 meters for a converter 10 of several kW, connected to the grid 6). For communication, a, UART protocol is used e.g. with a physical layer according to the RS-485 standard. The UART protocol is easy to implement and is used for the communication of a master with a plurality of slaves. The RS-485 standard defines the sending of signals on the bus in differential mode. As a result, over long distances (longer than a few meters), spurious effects and errors are strongly reduced, while maintaining an acceptable bit rate (4 Mbit/s) for the conversion system 5. The conversion modules 35 are e.g. all referenced to different potential points, and are then electrically isolated from one another. Since the communication bus 52 is shared with all the conversion modules 35, a galvanic isolation circuit (not shown) is used for exchanging data between the elementary controllers 40 and the communication bus 52. The galvanic isolation function is e.g. directly integrated into RS-485 communication units. Other isolation solutions can be envisaged, such as the use of opto-couplers, or even specialized circuits with integrated isolation (e.g. the reference ADUM3472ARSZ proposed by Analog Devices™).

The communication via the data bus 52 between the different elements of the conversion system 5 takes place, e.g. in "Full-Duplex" mode, i.e. there is a dedicated line for reception, a dedicated line for transmission, both lines being usable simultaneously.

In a variant, the communication via the data bus 52 between the different elements of the conversion system 5 takes place in "Half-Duplex" mode where a single communication line is used. Transmission and reception are then temporally interleaved. As a result, saving is achieved on the communication bus 52 (fewer drivers in the bus 52). On the other hand, the speed is reduced (transmission and reception cannot take place at the same time).

The regulation unit REG includes a receiver 94 and a transmitter 96, each compatible with the communication protocol of the data bus 52. In other words, the receiver 94 is apt to receive data from each of the elementary controllers 40 via the data bus 52, in particular the measured values of the elementary DC input voltages $V_{PV1}, V_{PV2}, \ldots, V_{PVN}$, the values of the optimum voltages $V_{opt\_1}, V_{opt\_2}, \ldots, V_{opt\_N}$, or even the measured values of the elementary DC input currents $I_{PV1}, I_{PV2}, \ldots, I_{PVN}$. The transmitter 96 is apt to regularly transmit data to the elementary controllers 40 via said bus 52, in particular the connection coefficients $K_1, K_2, \ldots, K_N$.

To regulate the output variable, the regulation unit REG typically includes a first regulation loop of a first type of variable, followed by a second regulation loop of a second type of variable, distinct from the first type.

In the example shown in FIG. 2 where the energy converter 10 is connected to the electrical grid 6, the regulated output variable is the output current $I_S$, and the first regulation loop is a voltage regulation loop, the second control loop being a current control loop.

In the example shown in FIG. 4 associated with the example of FIG. 2, the first regulation loop includes an adder 98 apt to make the difference between the sum of the values of the elementary DC input voltages $V_{PV1}$, $V_{PV2}$, ..., $V_{PVN}$ and the sum of the optimum voltage values $V_{opt\_1}$, $V_{opt\_2}$, ..., $V_{opt\_N}$; followed by an averager 100, in order to compare the average of the elementary DC input voltages $V_{PV1}$, $V_{PV2}$, ..., $V_{PVN}$ with the average of the optimum voltages $V_{opt\_1}$, $V_{opt\_2}$, ..., $V_{opt\_N}$. In addition, the first loop includes a corrector 102 connected to the output of the averager 100 in order to cancel the error between the average of the elementary DC input voltages $V_{PV1}$, $V_{PV2}$, ..., $V_{PVN}$ and the average of the optimum voltages $V_{opt\_1}$, $V_{opt\_2}$, ..., $V_{opt\_N}$ in static mode. The corrector 102 is e.g. a corrector a proportional integral (PI) corrector. In a variant, the corrector 102 is a proportional integral derivative (PID) corrector.

Advantageously, the first regulation loop further includes a filter 104, such as a band-stop filter around a frequency substantially equal to 100 Hz for a 50 Hz grid (or 120 Hz for a 60 Hz grid). Indeed, the conversion modules 35 produce a direct current power, while the output power on the electrical grid 6 is an alternating current power. The above means that, over a grid half-period (100 Hz or 120 Hz), when the instantaneous output power is lower (higher, respectively) than the sum of the powers of the conversion modules 35, the surplus energy is stored (released, respectively) by the capacitors 64 of the conversion modules 35. Over a grid half-period and in steady state, each capacitor 64 has stored as much energy as same has released. As a result, a natural oscillation occurs at 100 Hz on the voltage of the sources of energy 8, such as the photovoltaic units 20, the amplitude of which is inversely proportional to the value of the capacitor 64 and proportional to the elementary DC input current $I_{PVi}$ coming from the source of energy 8, e.g. from a photovoltaic unit 20. Such oscillation is then suppressed by the filter 104 so as to prevent finding same again on a reference current $I_{ref}$ delivered at the output of the first regulation loop.

To obtain a sinusoidal reference current $I_{ref}$, the first regulation loop advantageously further includes a phase-locked loop (PLL) unit 106 receiving as input the voltage $V_G$ of the electrical grid 6, as well as the current $I_G$ of said grid 6. The PLL unit 106 is then connected to the input of a sine function 108 so as to generate a term in $\sin(\omega_G t+\theta_G)$, i.e. a sinusoidal function of amplitude one in phase with the grid voltage $V_G$. Other mechanisms can be envisaged for obtaining the sinusoidal function of unit amplitude in phase with the grid voltage $V_G$, e.g. by dividing the grid voltage $V_G$ by the amplitude thereof.

The first regulation loop finally includes a multiplier 110 connected to the output of the filter 104 and to the output of the sine function 108, in order to multiply the term in $\sin(\omega_G t+\theta_G)$ with the current obtained at the output of the filter 104, so as to generate the reference current $I_{ref}$ which is thereby made sinusoidal.

In the example shown in FIG. 4, the second regulation loop then aims to compare the sinusoidal reference current $I_{ref}$ with the current $I_G$ of said grid 6, corresponding to the output current $I_S$ of the energy converter 10, the regulated output variable being in said example the output current $I_S$.

In said example, the second regulation loop includes a subtractor 112 apt to make the difference between the grid current $I_G$ and the reference current $I_{ref}$, followed by a regulator 114, preferentially a proportional resonant (PR) regulator, which cancels the setpoint tracking error even with a sinusoidal reference (of known frequency).

The second regulation loop then includes a linearization unit 116 connected to the output of the regulator 114, the linearization unit 116 including an adder 118 for summing the grid voltage $V_G$ at the output of the regulator 114, followed by a divider 120 for dividing said sum by the average of the elementary DC input voltages $V_{PV1}$, $V_{PV2}$, ..., $V_{PVN}$.

The second regulation loop finally includes a sorting unit 122 connected to the output of the linearization unit 116, the sorting unit 122 implementing a sorting algorithm selecting the sources of energy 8 which will be either connected or not connected during the next control iteration. The sourced of energy 8 connected in priority are the sources the voltage error $(V_{PV_i}-V_{opt_i})$ of which is the largest among the list of sources of energy 8, such as photovoltaic units 20, in working condition. Any faulty sources of energy (8) can be excluded from operation. The sorting unit 122 is then configured to generate the connection coefficients $K_1$, $K_2$, ..., $K_N$.

The first estimator 80 is configured to calculate, for each conversion module 35, the estimated value $\widehat{V_{PV_i}}(t_k)$ of the elementary DC input voltage $V_{PVi}$ as a function of the previously measured value $V_{PVi}(t_{k-p})$ of the elementary DC input voltage $V_{PVi}$, the capacitance $C_{PVi}$ of the capacitor 64 and a value of the current $I_{Ci}$ flowing through said capacitor 64.

Advantageously, the first estimator 80 is configured to calculate the value of the current $I_{Ci}$ flowing through said capacitor 64 by the difference between a value of an input elementary current $I_{PVi}$ received by the conversion module 35 and a value of a bridge current $I_{Hi}$ received by the switching bridge 58.

The first estimator 80 is e.g. configured to calculate, for each conversion module 35, the estimated value $\widehat{V_{PV_i}}(t_k)$ of the elementary DC input voltage $V_{PVi}$ according to the following equation:

$$\widehat{V_{PV_i}}(t_k) = V_{PV_i}(t_{k-1}) + \left(I_{PV_i}(t_k) - I_{H_i\_M}(t_k)\right) \cdot \frac{t_k - t_{k-1}}{C_{PV_i}} \quad [1]$$

where $\widehat{V_{PV_i}}(t_k)$ is the estimated value of the elementary DC input voltage $V_{PVi}$, $V_{PVi}(t_{k-1})$ represents a preceding value of the elementary DC input voltage $V_{PVi}$, $I_{PVi}(t_k)$ is the value of the input elementary current $I_{PVi}$, $t_k$, and $t_{k-1}$, respectively, represent current and preceding, respectively, instants, where C represents the capacitance of the capacitor 64, and $I_{Hi\_M}(t_k)$ represents the average value of the bridge current $I_{Hi}$ between the instants $t_{k-1}$ and $t_k$.

The preceding value $V_{PVi}(t_{k-1})$ of the elementary DC input voltage $V_{PVi}$ is the previously measured value $V_{PVi}$ $(t_{k-p})$ of the elementary DC input voltage $V_{PVi}$ if same has been measured for the preceding instant, i.e. if the preceding instant $t_{k-1}$ corresponds to the instant of the preceding measurement of the elementary DC input voltage $V_{PVi}$, i.e. k−1=k−p, meaning p=1. Alternatively, the preceding value $V_{PVi}(t_{k-1})$ of the elementary DC input voltage $V_{PVi}$ is the preceding estimated value $\widehat{V_{PV_i}}(t_{k-1})$ of the elementary DC input voltage $V_{PVi}$ if said previously measured value $V_{PVi}(t_{k-p})$ has been measured for an instant $t_{k-p}$ prior to the preceding instant $t_{k-1}$, i.e. if the preceding instant $t_{k-1}$ is later than the instant of the preceding measurement of the elementary DC input voltage $V_{PVi}$, i.e. k−1>k−p, i.e. p>1.

The person skilled in the art will understand that the preceding equation [1] is obtained from the following equation:

$$I_{PV_i}(t) = I_{C_i}(t) + I_{H_i}(t) = C_{PV_i} \cdot \frac{dV_{PV_i}(t)}{dt} + I_{H_i}(t) \quad [2]$$

Where $I_{PVi}$ is the input elementary current, $I_{Ci}$ represents the current flowing through the capacitor 64, $I_{Hi}$ represents the current received by the switching bridge 58, where C represents the capacitance of the capacitor 64, and $V_{PVi}$ represents the elementary DC input voltage, said variables being visible in FIG. 2.

Figure 8:
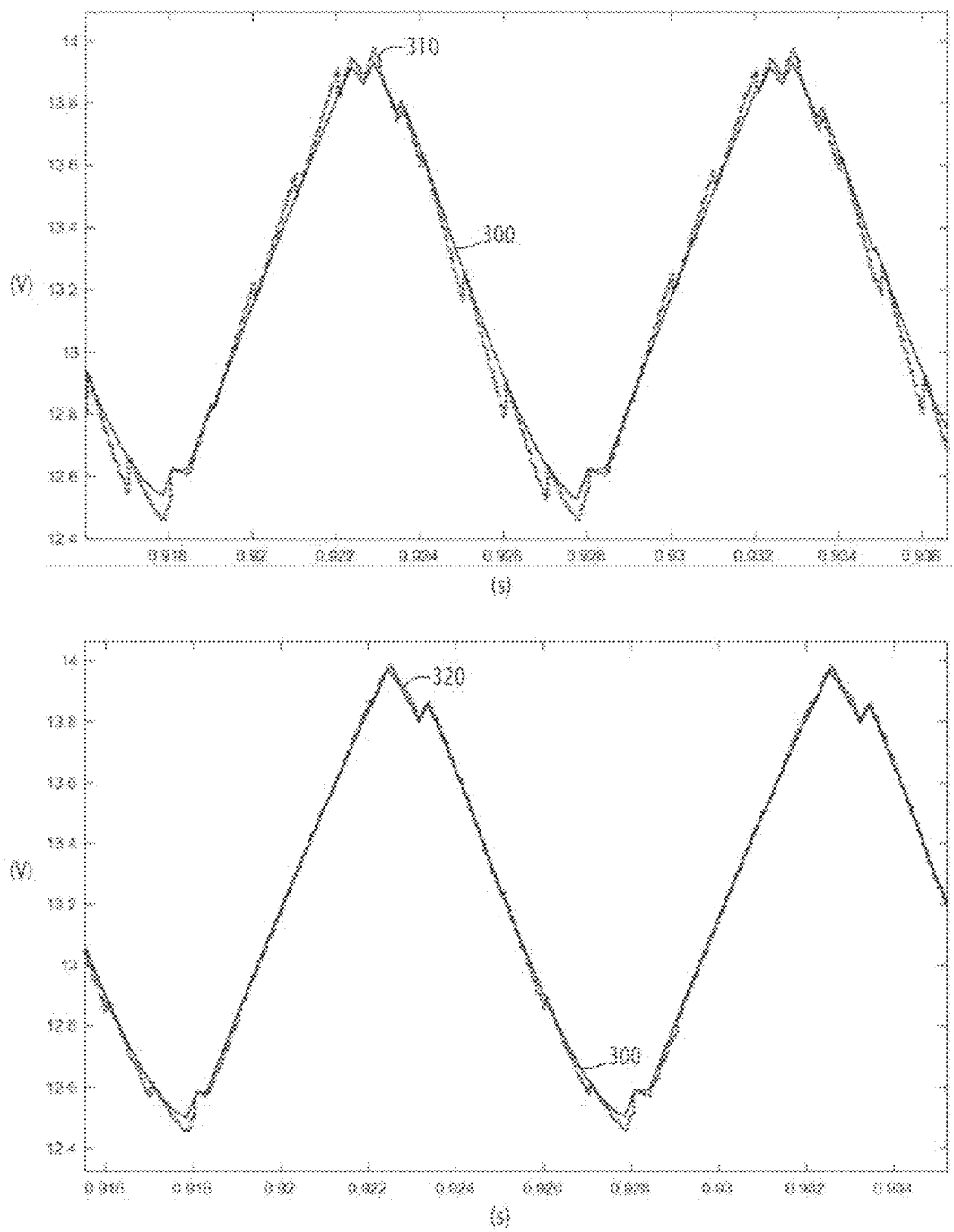
FIG. 8 is a view with two sets of curves, associated with a respective elementary DC input voltage; a first set including two curves representing, correspondingly, a real value of said voltage and an estimated value of said voltage, calculated by the first estimator; a second set including two curves representing, correspondingly, the real value of said voltage and an estimated value of said voltage calculated by the first estimator for which a value of the capacitance of a capacitor connected to the input of the conversion module is further estimated by a third estimator included in the main controller.

The average value $I_{Hi\_M}(t_k)$ of the bridge current $I_{Hi}$ satisfies e.g. the following equation:

$$I_{H_i\_M}(t_k) = \frac{1}{t_k - t_{k-1}} \int_{t_{k-1}}^{t_k} I_{H_i}(t) \cdot dt = f_B \cdot \int_{t_{k-1}}^{t_k} I_{H_i}(t) \cdot dt \quad [3]$$

where $f_B$ represents the frequency at which the regulation of the output variable $I_S$, $V_S$ of the energy converter 10 is carried out by the main controller 50, i.e. the frequency of a regulation loop of said output variable $I_S$, $V_S$, described thereafter with reference to FIG. 8.

The skilled person would observe that the frequency $f_B$ at which the regulation of the output variable $I_S$, $V_S$ is performed by the main controller 50 also corresponds to the frequency at which the estimations of the elementary DC input voltage $V_{PVi}$ by the main controller 50 will be performed, the frequency $f_B$ of the regulation loop being equal to the inverse of the period between two successive instants $t_{k-1}$ and $t_k$ of calculation of said estimation. The frequency $f_B$ of the regulation loop of the output variable $I_S$, $V_S$ then also corresponds to the operation frequency of the main controller 50.

The skilled person would note that, when the conversion module 35 is configured in positive or negative polarity, the current $I_{Hi}$ received by the switching bridge 58, i.e. the input current of the switching bridge 58, corresponds to +/−$I_S$, i.e. to +/−$I_G$ if the converter 10 is connected to the grid 6; and when the conversion module 35 is in bypass or open mode, the current $I_{Hi}$ received by the switching bridge 58 is zero. The output current $I_S$, or the current $I_G$ of the grid 6, is measured directly by the main controller 50, and is sampled at the frequency $f_B$ of the regulation loop, referred to thereafter as the loop frequency $f_B$. Furthermore, the main controller 50 knows, at each instant, the configuration of all of the conversion modules 35, since it is the controller which determines and controls the configurations, via the elementary controllers 40. The main controller 50 is thus apt to determine the value of the current $I_{Hi}$ received by the switching bridge 58, with sampling instants according to the loop frequency $f_B$.

As an optional supplement, the second estimator 85 is configured to calculate, for each conversion module 35, the estimated average <$I_{PVi}$> of the elementary input current $I_{PVi}$ over a period of averaging $T_g$, as a function of the total output voltage $V_S$ and of the output current $I_S$ delivered at the output of the energy converter 10, and of an average value <$V_{PVi}$> of the elementary DC input voltage $V_{PVi}$ over the period of averaging $T_g$.

The period of averaging $T_g$ typically depends on a half-period of the output voltage $V_S$. The period of averaging $T_g$ is preferentially a multiple of the half-period of the output voltage $V_S$, said multiple being an integer with a value greater than or equal to 1. The period of averaging $T_g$ is preferentially still substantially equal to the period of the output voltage $V_S$.

The second estimator 85 is e.g. configured to calculate, for each conversion module 35, the estimated average <$I_{PVi}$> of the elementary input current $I_{PVi}$ according to the following equation:

$$<I_{PV_i}> = \frac{1}{T_g} \cdot \frac{\int_{t_0}^{t_0+T_g} V_S(t) \cdot I_S(t) \cdot |K_i(t)| \, dt}{<V_{PV_i}>} \quad [4]$$

where <$I_{PVi}$> is the estimated average of the input elementary current $I_{PVi}$, $T_g$ represents the period of averaging, $V_S$ is the total output voltage, $I_S$ is the output current, <$V_{PVi}$> represents the average value of the elementary DC input voltage $V_{PVi}$ over said period of averaging $T_g$, and $K_i$ represents a connection coefficient, $K_i$ being equal to 0 when no source of energy 8 is connected to the input of the corresponding conversion module 35, and $K_i$ being different from 0 when at least one source of energy 8 is connected to the input of said module 35.

When the source of energy 8 is formed by a single photovoltaic unit 20, as in the example shown in FIG. 2, the associated connection coefficient $K_i$ is equal to +1 when the conversion module 35 is connected in positive polarity, equal to −1 when the conversion module 35 is connected in negative polarity, and equal to 0 when the conversion module 35 is disconnected (by-pass or open).

When the source of energy 8 is formed of a plurality of photovoltaic units 20, as in the example shown in FIG. 3, the associated connection coefficient $K_i$ is—when same is non-zero—a multiple of 1/Q, where Q represents the number of photovoltaic units 20 for the source of energy 8 associated with the conversion module 35. The multiple is a relative integer, i.e. a positive or negative integer, the value of which depends on a connection configuration of the photovoltaic units 20 and on a connection state of each of the photovoltaic units 20, each connection state being one among connected and disconnected.

Examples of the value of the connection coefficient $K_i$ associated with a source of energy 8 formed of a plurality of photovoltaic units 20 are described below with reference to Table 1 in the example of the first arrangement A1 shown in FIG. 3, and opposite table 2 in the example of the second arrangement A2 shown in FIG. 3.

The third estimator 90 is configured to estimate a current value of the capacitance $C_{PVi}$ of the capacitor 64.

The value of the capacitance $C_{PVi}$ of the capacitor 64 is typically supplied by the manufacturer of said capacitor 64 with a tolerance which can go up to +/−30%, and the capacitance $C_{PVi}$ varies with time. It is therefore advantageous to estimate, via the third estimator 90 and with better accuracy, the value thereof during the operation of the energy converter 10.

The third estimator 90 is typically configured to estimate a current value of the capacitance $C_{PVi}$ of the capacitor 64 by correcting a preceding estimated value of the capacitance $C_{PVi}$ of the capacitor 64 based, on the one hand, on the sign of the difference between a value of a bridge current $I_{Hi}$ received by the switching bridge 58 and a value of an elementary input current $I_{PVi}$ received by the conversion module 35, called the first sign; and, on the other hand, on the sign of the difference between the estimated value $\widehat{V_{PV_i}}(t_k)$ of the elementary DC input voltage $V_{PVi}$ and the subsequently measured value $V_{PVi}(t_{k+1})$ of the elementary DC input voltage $V_{PVi}$, called the second sign; an initial estimated value of the capacitance $C_{PVi}$ of the capacitor 64 being predefined.

If the first and second signs are identical, the estimated current value of the capacitance $C_{PVi}$ of the capacitor 64 is e.g. equal to the preceding estimated value of the capacitance $C_{PVi}$ of the capacitor 64 minus a correction step $\Delta C_{PVi}$; and if the first and second signs are distinct, the current estimated value of the capacitance $C_{PVi}$ of the capacitor 64 is e.g. equal to the preceding estimated value of the capacitance $C_{PVi}$ of the capacitor 64 increased by the correction step $\Delta C_{PVi}$.

The correction step $\Delta C_{PVi}$ is e.g. on the order of one percent of the initial value of the capacitance $C_{PVi}$ of the capacitor 64.

In other words, the principle of the third estimator 90 is to compare the estimated data with the real data transferred by the communication bus 52. Indeed, the value of the capacitance $C_{PVi}$ of the capacitor 64 is the only data item of equation (2) or of equation (1) which is not perfectly known, at the beginning of the operation of the energy converter 10. Thereby, when the main controller 50 receives a new measured value of the elementary DC input voltage $V_{PVi}$, the latter will compare the voltage that same estimated (by means of the first estimator 80 thereof) with the voltage measured.

There are then a plurality of cases to consider:

If $I_{H_i}(t_k) - I_{PV_i}(t_k) > 0$:

if the estimated voltage is higher than the actual voltage, then the value of the capacitance $C_{PVi}$ of the capacitor (64) (taken into account in equation (1)) is too high compared to the actual value;

if the estimated voltage is lower than the actual voltage, then the value of the capacitance $C_{PVi}$ of the capacitor 64 (taken into account in equation (1)) is too low compared to the actual value.

If $I_{H_i}(t_k) - I_{PV_i}(t_k) < 0$:

if the estimated voltage is lower than the actual voltage, then the value of the capacitance $C_{PVi}$ of the capacitor (64) (taken into account in equation (1)) is too high compared to the actual value;

if the estimated voltage is higher than the actual voltage, then the value of the capacitance $C_{PVi}$ of the capacitor 64 (taken into account in equation (1)) is too low compared to the actual value.

If the estimated voltage is equal to the actual voltage, then the value of the capacitance $C_{PVi}$ of the capacitor 64 (taken into account in equation (1)) is equal to the actual value.

The algorithm for correcting the value of the capacitor 64 by successive steps is used for quickly (in a few periods of the grid voltage $V_G$) recovering the real value of the capacitance $C_{PVi}$ of each capacitor 64 of the conversion system 5. A plurality of advantages result therefrom. Firstly, the first estimator 80 is improved due to a better accuracy on the estimation of the elementary DC input voltage $V_{PVi}$. Secondly, the change of the passive elements of the conversion modules 35 can be tracked. Indeed, in an electronic power converter, capacitors are often the most fragile elements and the aging thereof is generally characterized by a gradual decrease in the real value of the capacitance thereof. The third estimator 90 is thus used for anticipating future failures and for targeting repairs.

In the example of the first arrangement A1 shown in FIG. 3, the conversion module 35 is coupled to two photovoltaic units 20, denoted by $P_{ai}$ and $P_{bi}$, which can be dynamically configured in series or in parallel, depending on the state of the first, second and third switches 28, 30, 32. The two photovoltaic units $P_{ai}$ and $P_{bi}$ and the two capacitors $C_{PVAI}$ and $C_{PVbi}$ of the corresponding capacitors 64, connected between the terminals of the photovoltaic units $P_{ai}$ and $P_{bi}$, are considered identical or close. The behaviors of the photovoltaic unit $P_{ai}$ with the capacitor $C_{PVAi}$ and of the photovoltaic unit $P_{bi}$ with the capacitor $C_{PVbi}$ are thus considered to be substantially identical, with similar currents $I_{cai}$ and $I_{cbi}$, similar currents $I_{PVAI}$ and $I_{PVbi}$ and similar voltages $V_{PVAI}$ and $V_{PVbi}$. The elementary DC input voltage $V_{PVi}$ is then a linear combination of the voltages $V_{PVAI}$ and $V_{PVbi}$ at the terminals of the two photovoltaic units 20, typically written in the form $V_{PVi}=\alpha V_{PVAI}+\beta V_{PVbi}$, with $\alpha$ and $\beta$ representing the coefficients of the linear combination. The linear combination of the voltages $V_{PVAI}$ and $V_{PVbi}$ is e.g. the average value of the voltages $V_{PVAI}$ and $V_{PVbi}$ ($\alpha\beta=\frac{1}{2}$), or the value of one of the voltages $V_{PVAI}$ and $V_{PVbi}$ of the photovoltaic units 20 ($\alpha=1$ and $\beta=0$) for limiting the number of measurements, the two voltages $V_{PVAI}$ and $V_{PVbi}$ being similar.

In the case of an estimation of the capacitance $C_{PVi}$ of the capacitor 64, it is then considered that the estimated value corresponds to a weighting of the two capacitances $C_{PVi}=\alpha C_{PVAI}+\beta C_{PVbi}$, with $\alpha$ and $\beta$ the aforementioned coefficients of the linear combination of voltages $V_{PVAI}$ and $V_{PVbi}$ for determining the elementary DC input voltage $V_{PVi}$. The estimated value of the capacitance $C_{PVi}$ of the capacitor 64 then typically corresponds to the value of one or other of the two capacitances $C_{PVAI}$ and $C_{PVbi}$ of the corresponding capacitors 64, or else to an average value of the two capacitances $C_{PVAI}$ and $C_{PVbi}$.

The skilled person would note that it is possible to short-circuit a photovoltaic unit 20 so as to no longer use same, e.g. following a failure on a respective photovoltaic unit 20. In the example of the first arrangement A1 shown in FIG. 3, in order to short-circuit the photovoltaic unit $P_{ai}$ it is necessary to close the switches K5 and K6; and in order to short-circuit the photovoltaic unit $P_{bi}$, it is necessary to close the switches K6 and K7. If a photovoltaic unit 20 is short-circuited, it is then possible to continue to operate with the other photovoltaic unit 20 according to the example of embodiment shown FIG. 2, described hereinabove, where each source of energy 8 consists of a single photovoltaic unit 20.

Table 1 below then shows the main configurations of the first arrangement A1 of FIG. 3, as well as the corresponding value of the connection coefficient of each photovoltaic unit 20, then denoted $K_{PVi}$, instead of the notation $K_i$ used in the case of a single photovoltaic unit 20. The connection coefficient $K_{PVi}$ forms the link between the elementary DC input current $V_{PVi}$ between the grid current $I_G$.

TABLE 1

| Configuration/state | List of closed switches | $I_{PV_i}$ | $K_{PV_i}$ |
|---|---|---|---|
| Series + Positive polarity | K6 and K2, K3 | $I_G$ | 1 |
| Parallel + positive polarity | K5, K7 and K2, K3 | $\dfrac{I_G}{2}$ | 1/2 |
| Bypass/circumvention | K1, K3 or K2, K4 | 0 | 0 |
| All open | Configuration that tends to make IG drop to zero | $-|I_G|$ | $\dfrac{-I_G}{|I_G|}$ |
| Parallel + Negative polarity | K5, K7 and K1, K4 | $-\dfrac{I_G}{2}$ | −1/2 |
| Series + Negative polarity | K6 and K1, K4 | $-I_G$ | −1 |

In the example of the second arrangement A2 shown in FIG. 3, the module contains four photovoltaic units 20, denoted by $P_{a1i}$, $P_{b1i}$, $P_{a2i}$ and $P_{b2i}$. Within the first pair SG1, the photovoltaic units $P_{a1i}$, $P_{b1i}$; and within the second pair SG2, respectively, the photovoltaic units $P_{a2i}$ and $P_{b2i}$ can be dynamically configured in series or in parallel, depending on the state of the respective first, second and third switches 28, 30, 32. The two pairs SG1, SG2 are as such dynamically configurable in series or in parallel, depending on the state of the respective first, second and third switches 28, 30, 32 interconnecting the two pairs SG1, SG2, i.e. the switches $K_5$, $K_6$ and $K_7$. Finally, the output of the conversion module 35 according to the second arrangement A2 can be in positive polarity, in negative polarity, in by-pass or in all open mode, depending on the state of the switches 38, i.e. of the switches $K_1$, $K_2$, $K_3$ and $K_4$, of the switching bridge 58 of said conversion module. Similar to what was described hereinabove for the first arrangement A1, the photovoltaic units $P_{a1i}$, $P_{b1i}$, $P_{a2i}$ and $P_{b2i}$ and the respective capacitances $C_{PVa1i}$, $C_{PVb1i}$, $C_{PVa2i}$ and $C_{PVb2i}$ are considered identical or similar. The behaviors of the photovoltaic units with the respective capacitors 64 thereof are thus considered to be substantially identical, with similar currents $I_{Ci}$ and $I_{PVi}$ and similar voltages $V_{PVi}$. Thereby, the elementary DC input voltage $V_{PVi}$ can be measured on one of the four photovoltaic units 20 (e.g. $V_{PVi}=V_{PV2ai}$), or obtained by averaging the voltages of the four photovoltaic units 20 for taking into account in a better way, possible dispersions ($V_{PVi}=(V_{PV1ai}+V_{PV1bi}+V_{PV2ai}+V_{PV2bi})/4$). More generally, the elementary DC input voltage $V_{PVi}$ is any linear combination of the individual voltages of the four photovoltaic units 20, typically written in the form $V_{PVi}=\alpha V_{PV1ai}+\beta V_{PV1bi}+\gamma V_{PV2ai}+\delta V_{PV2bi}$, with $\alpha$, $\beta$, $\gamma$ and $\delta$ representing the coefficients of the linear combination. Furthermore, if one of the photovoltaic units 20 fails, same can be by-passed, and the voltage is then ignored.

In the case of an estimation of the capacitance $C_{PVi}$ of the capacitor 64, it is then considered that the estimated value corresponds to any linear combination of the individual capacitances, typically written in the form $CC_{PVi}=\alpha C_{PV1ai}+\beta C_{PV1bi}+\gamma C_{PV2ai}+\delta C_{PV2bi}$, with $\alpha$, $\beta$, $\gamma$ and $\delta$ representing the coefficients of the linear combination, depending on the weighting that was used for determining the capacitance $C_{PVi}$.

The skilled person would note that it is possible to short-circuit a photovoltaic unit 20 so as to no longer use same, e.g. following a failure on a respective photovoltaic unit 20. In the example of the second arrangement A2, to short-circuit a photovoltaic unit 20, the closing of two switches is sufficient; e.g., by closing $K_{15}$ and $K_{16}$ to short-circuit the photovoltaic unit $P_{a1i}$, or else by closing $K_{16}$ and $K_{17}$ to short-circuit the photovoltaic unit $P_{a1b}$; and similarly for the second pair SG2. The other photovoltaic units 20 remain usable.

Table 2 below then shows the main configurations of the second arrangement A2 of FIG. 3, as well as the corresponding value of the connection coefficient of each photovoltaic unit 20, then denoted by $K_{PVi}$, instead of the notation $K_i$ used in the case of a single photovoltaic unit 20. The connection coefficient $K_{PVi}$ forms the link between the elementary DC input current $V_{PVi}$ between the grid current $I_G$.

TABLE 2

| Configuration/state | List of closed switches | $I_{PV_i}$ | $K_{PV_i}$ |
|---|---|---|---|
| (SG1 series) series (SG2 series) and polarity + | K16, K6, K26 and K2, K3 | $I_G$ | 1 |
| (SG1 //) series (SG2 series) and polarity + alternated at 50% with (SG1 series) series (SG2 //) and polarity + | K15, K17, K6, K26 and K2, K3<br>K16, K6, K25, K27 and K2, K3 | $\dfrac{3\,I_G}{4}$ | 3/4 |
| (SG1 //) series (SG2 //) and polarity + | K15, K17, K6, K25, K27 and K2, K3 | $\dfrac{I_G}{2}$ | 1/2 |
| (SG1 series) // (SG2 series) and polarity + | K16, K5, K7, K26 and K2, K3 | $\dfrac{I_G}{2}$ | 1/2 |
| (SG1 //) // (SG2 //) and polarity + | K15, K17, K5, K7, K25, K27 and K2, K3 | $\dfrac{I_G}{4}$ | 1/4 |
| (SG1 //) // (SG2 series) or (SG1 //) // (SG2 series) | Prohibited configurations | | |
| Bypass/circumvention | K1, K3 or K2, K4 and any config | 0 | 0 |
| All open | Configuration that tends to make IG drop to zero | $-|I_G|$ | $\dfrac{-I_G}{|I_G|}$ |
| (SG1 //) // (SG2 //) and polarity - | K15, K17, K5, K7, K25, K27 and K1, K4 | $-\dfrac{I_G}{4}$ | −1/4 |
| (SG1 series) // (SG2 series) and polarity - | K16, K5, K7, K26 and K1, K4 | $-\dfrac{I_G}{2}$ | −1/2 |
| (SG1 //) series (SG2 //) and polarity - | K15, K17, K6, K25, K27 and K1, K4 | $-\dfrac{I_G}{2}$ | −1/2 |
| (SG1 //) series (SG2 series) and polarity alternated at 50% with (SG1 series) series (SG2 //) and polarity - | K15, K17, K6, K26 and K1, K4<br>K16, K6, K25, K27 and K1, K4 | $-\dfrac{3\,I_G}{4}$ | −3/4 |

TABLE 2-continued

| Configuration/state | List of closed switches | $I_{PV_i}$ | $K_{PV_i}$ |
|---|---|---|---|
| (SG1 series) series (SG2 series) and polarity - | K16, K6, K26 and K1, K4 | $-I_G$ | $-1$ |
| (SG1) series (SG2 series) polarity + | K15, K16, K6, K26 and K2, K3 | $I_G$ | $1$ |
| (SG1) series (SG2 //) and polarity + alternated at 50% with (SG1 isolated) // (SG2 and polarity + Series) | K15, K16, K6, K25, K27 and K2, K3 <br> K15, K16, K7, K26 and K2, K3 | $\dfrac{I_G}{2}$ | $1/2$ |
| (SG1) // (SG2 //) and polarity + | K15, K16, K5, K7, K25, K27 and K2, K3 | $\dfrac{I_G}{3}$ | $1/3$ |
| Bypass/circumvention | K1, K3 or K2, K4 and any config | $0$ | $0$ |
| (SG1) / (SG2 //) and polarity - | K15, K16, K5, K7, K25, K27 and K1, K4 | $-\dfrac{I_G}{3}$ | $-1/3$ |
| (SG1) series (SG2 //) and polarity alternated at 50% with (SG1 isolated) // (SG2 series) and polarity - | K15, K16, K6, K25, K27 and K1, K4 <br> K15, K16, K7, K26 and K1, K4 | $-\dfrac{I_G}{2}$ | $-1/2$ |
| (SG1) series (SG2 series) and polarity - | K15, K16, K6, K26 and K1, K4 | $-I_G$ | $-1$ |

Figure 5:
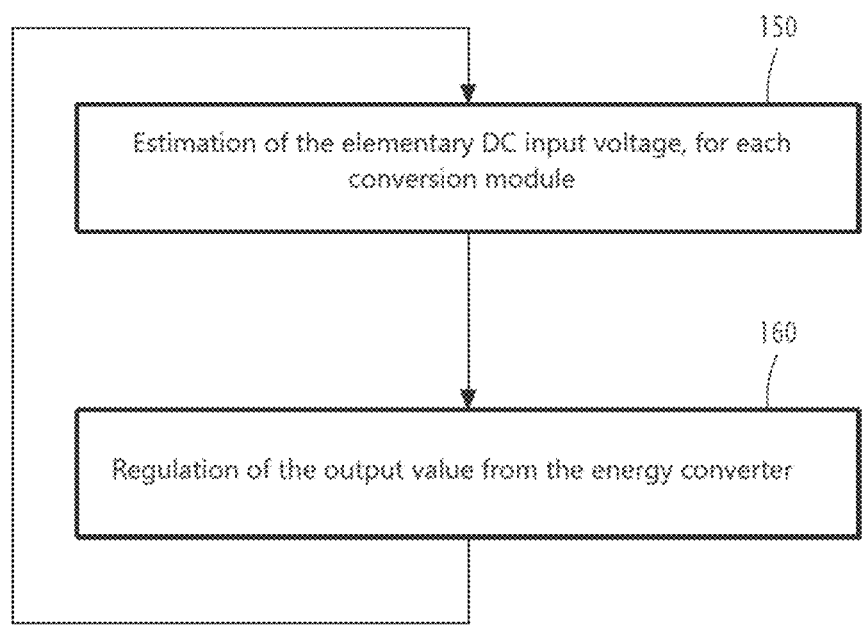
FIG. 5 is a flowchart of a method for controlling the electric energy converter shown in FIG. 1, implemented by the main controller.

The operation of the electronic control device 15, and in particular of the main controller 50 according to the invention, will now be described with reference to FIG. 5 which represents a flowchart of the method for controlling the electric energy converter 10 according to the invention, the control method being implemented by a main controller 50.

During an initial step 100, the main controller 50 calculates, via the first estimator 80 thereof and for each conversion module 35, an estimated value $\widehat{V_{PV_i}}(t_k)$ of the elementary DC input voltage $V_{PV_i}$ from a previously measured value $V_{PV_i}(t_{k-p})$ of the elementary DC input voltage $V_{PV_i}$.

The estimated value $\widehat{V_{PV_i}}(t_k)$ of the elementary DC input voltage $V_{PV_i}$ is e.g. calculated according to the preceding equation (1).

As an optional supplement, during the initial step 100, the main controller 50 also calculates, via the second estimator 85 thereof and for each conversion module 35, the estimated average $\langle I_{PV_i} \rangle$ of the input elementary current $I_{PV_i}$. Said estimated value $\langle I_{PV_i} \rangle$ is then used for calculating the estimated value $\widehat{V_{PV_i}}(t_k)$ of the elementary DC input voltage $V_{PV_i}$, and then prevents the addition of a current sensor for each respective conversion module 35.

Said estimated value $\langle I_{PV_i} \rangle$ is e.g. calculated according to the preceding equation (4).

As an additional optional supplement, during the initial step 100, the main controller 50 also estimates, via the third estimator 90 thereof and for each conversion module 35, a current value of the capacitance $C_{PV_i}$ of the capacitor 64. The additional optional supplement further improves the estimation of the elementary DC input voltage $V_{PV_i}$.

The third estimator 90 typically estimates the current value of the capacitance $C_{PV_i}$ of the capacitor 64 by correcting a preceding estimated value of the capacitance $C_{PV_i}$ of the capacitor 64 based, on the one hand, on the sign of the difference between a value of a bridge current $I_{Hi}$ received by the switching bridge 58 and a value of an elementary input current $I_{PV_i}$ received by the conversion module 35, called the first sign; and, on the other hand, on the sign of the difference between the estimated value $\widehat{V_{PV_i}}(t_k)$ of the elementary DC input voltage $V_{PV_i}$ and the subsequently measured value $V_{PV_i}(t_{k+1})$ of the elementary DC input voltage $V_{PV_i}$, called the second sign; the initial estimated value of the capacitance $C_{PV_i}$ of the capacitor 64 being predefined.

At the end of the step 100 of estimating the elementary DC input voltage $V_{PV_i}$, the main controller 50 carries out, during a following step 110 and via the regulation unit REG thereof, the regulation of the output variable $I_S$, $V_S$ of the energy converter 10 by sending control commands to the elementary controllers 40. The regulation is carried out based on sets of elementary variable(s), each set of elementary variable(s) being associated with a respective conversion module 35. The set of elementary variable(s) includes in particular the elementary DC input voltage $V_{PV_i}$, and the value of the elementary DC input voltage $V_{PV_i}$ taken into account for the regulation is then a value measured by the elementary controller 40 when same has just been measured, and otherwise the estimated value $\widehat{V_{PV_i}}(t_k)$ calculated by the first estimator 80.

For the purposes of the regulation step 110, each elementary controller 40 regularly measures values of the set of elementary variables for the respective conversion module 35 with which the controller is associated, and then transmits same to the main controller 50, as described hereinabove with reference to FIG. 4.

The control method is then reiterated by returning to the estimation step 100 at the end of the regulation step 110, the control method being implemented periodically, typically at the loop frequency $f_B$, e.g. on the order of 20 KHz.

As described hereinabove, the regulation unit REG takes as input the data of the photovoltaic units 20 ($V_{PV}$ and $V_{opt}$ of each photovoltaic unit 20) as well as the grid data ($V_G$ and $I_G$) for determining the control commands. In order to correctly regulate the input (voltages $V_{PV_i}$ of the photovoltaic units 20) and output (grid current $I_G$) variables, it is preferable to choose the loop frequency $f_B$ with a value much higher than the frequency $f_G$ of the electrical grid 6, i.e. $f_B >> f_G$. Moreover, the increase in said frequency leads to reducing the size of the output filter 16, as well to a better regulation of the variables (harmonic distortion ratio, power factor). The value chosen for the loop frequency $f_B$ is e.g. on the order of 20 KHz, which makes it possible to compare the control of the converter 10 according to the invention with the control of commercial inverters while having very good performance (regulation and size of the filter). The data management is summarized in the Table 3 below. The measurements of the grid voltage and current ($V_G$ and $I_G$) do not pose any constraints on the communication bus 52, since same are measured in real time directly by the main controller 50, the acquisition frequency depends only on the capacities of the main controller 50. The optimal voltages $V_{opt\_i}$ (calculated e.g. via the implementation of the MPPT algorithm) change slowly depending on the sunshine and on the temperature. It is thus possible to transfer such information at low frequency, i.e. $f_{MPPT} << f_B$, where $f_{MPPT}$ represents the calculation frequency according to the MPPT algorithm.

On the other hand, the elementary DC input voltages $V_{PV_i}$ have to advantageously be sent in real time to the main controller 50 in order to allow a good regulation of said variables. However, the constraints of the communication bus 52 limit the refresh frequency $f_D$ of the data.

TABLE 3

| Data | Refresh frequency | Type of acquisition |
|---|---|---|
| $I_G$ | $f_B$ | Direct measurement by the main controller 50 |
| $V_G$ | $f_B$ | Direct measurement by the main controller 50 |
| $V_{opt_1}, V_{opt_2}, \ldots, V_{opt_n}$ | $f_{MPPT}$ | Communication bus 52 |
| $V_{PV_1}, V_{PV_2}, \ldots, V_{PV_n}$ | $f_D$ | Communication bus 52 |

As an example for the communication bus 52, the RS-485 physical layer provides a bit rate limited to 4 Mbit/s. Such limit comes from the distance traveled by the signals in the cables between the main controller 50 and the most distant elementary controller 40. At such a frequency, the refresh frequency $f_D$ of the data is provided by the following equation:

$$f_D = N * \left((n_{bits} + n_{CRC}) * \frac{1}{D_{UART}} + t_{DT}\right) \quad [5]$$

where $f_D$ is the refresh frequency of the data, (expressed in Hz);

$n_{bits}$ is the number of bits transferred including Start and Stop bits, expressed in bits;

$n_{CRC}$ is the number of bits in the Cyclic Redundancy Check (CRC) frame, expressed in bits;

$D_{UART}$ represents the bit rate of the communication bus 52, expressed in Mbit/s; and $t_{DT}$ represents the waiting time between two frames on the communication bus 52, expressed in μs. The waiting time makes it possible to prevent collisions on the communication bus 52 which would lead to a fault.

As an example, the values chosen for the aforementioned parameters of the communication bus 52 are summarized in Table 4 below. With the specified parameters, the refresh frequency $f_D$ is limited to 2.5 kHz, i.e. about one tenth of the desired operation frequency, the loop frequency $f_B$ being on the order of 20 KHz.

TABLE 4

| Data | Details | Value |
|---|---|---|
| N | Number of modules | 13 |
| $n_{bits}$ | Number of data bits | 20 (including 4 bits of Start/Stop) |
| $n_{CRC}$ | The number of bits in the CRC | 10 (including 2 bits of Start/Stop) |
| $D_{UART}$ | UART bit rate | 4 Mbit/s |
| $t_{DT}$ | Waiting time between 2 frames | 25 μs |
| $f_D$ | Refresh frequency | 2.5 kHz |

Moreover, given that the refresh frequency $f_D$ is inversely proportional to the number N of conversion modules 35, an increase in said number N of conversion modules 35 tends to widen even more the difference between the refresh frequency $f_D$ and the loop frequency $f_B$.

The first estimator 80 then can be used for remedying such limitation, by calculating, at the loop frequency $f_B$, the estimated value $\widehat{V_{PV_i}}(t_k)$ of the elementary DC input voltage $V_{PV_i}$, while the measured values of the elementary DC input voltage $V_{PV_i}$ are transmitted to the main controller at the refresh frequency $f_D$.

The skilled person would thereby understand that, when the refresh frequency $f_D$ is approximately one tenth of the loop frequency $f_B$, the regulation of the output variable $I_S$, $V_S$ of the energy converter 10 is then carried out approximately 1 time out of 10 with a measured value of the elementary DC input voltage $V_{PV_i}$ and thus approximately 9 times out of 10 with the estimated value $\widehat{V_{PV_i}}(t_k)$ of the elementary DC input voltage $V_{PV_i}$, calculated by the first estimator 80.

Thereby, the control device 15 according to the invention makes it possible to operate the conversion system 5 at the operating frequency $f_B$ higher than the refresh frequency $f_D$ without, however, reducing the stability and accuracy on the regulation of the variables $V_{PV_i}$ and $I_G$.

Figure 6:
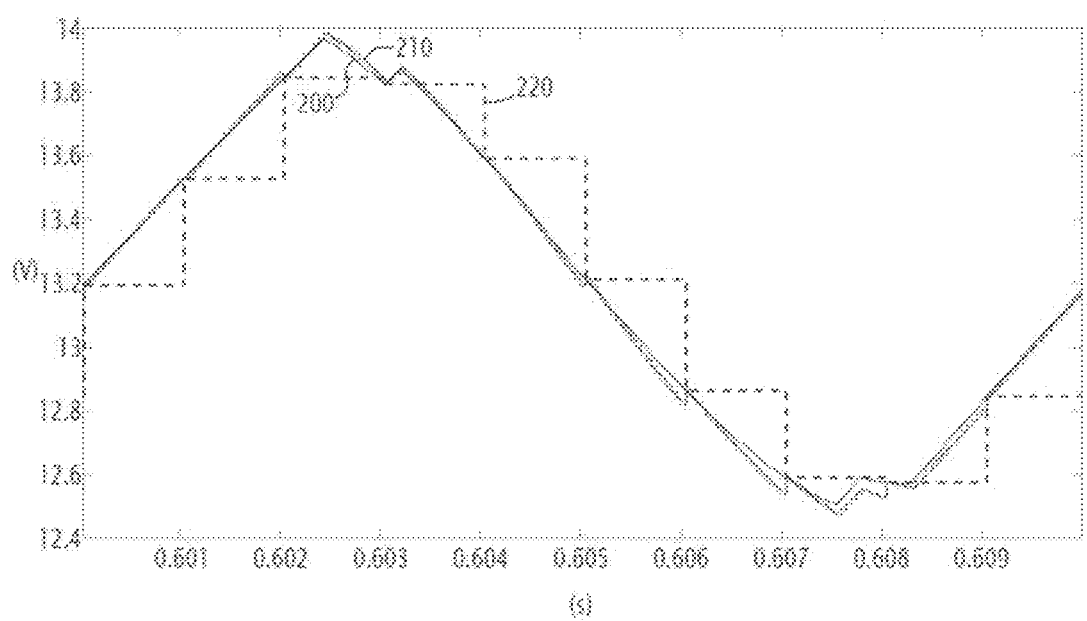
FIG. 6 is a view with three curves associated with a respective elementary DC input voltage, representing, correspondingly, a real value of said voltage; an estimated value of said voltage, calculated by a first estimator included in the main controller; and a measured value of said voltage, transmitted to the main controller by the respective elementary controller.
Figure 7:
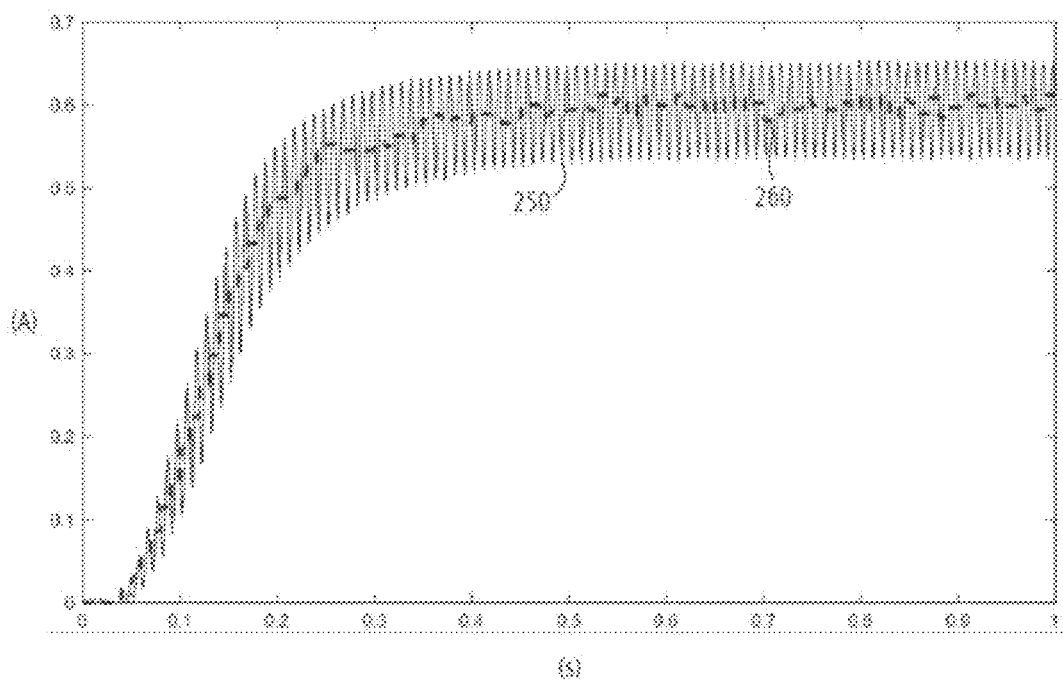
FIG. 7 is a view with two curves associated with an input elementary current received by a respective conversion module, representing, correspondingly, an actual value of said current, and an estimated value of said current, calculated by a second estimator included in the main controller.

The results obtained with the control device 15 according to the invention are then illustrated in FIGS. 6 to 8.

FIG. 6 shows the instantaneous real voltage of the photovoltaic unit 20 via the continuous line curve 200. The voltage is a direct voltage, with an average value equal to 13.2 V, with a natural continuous ripple at 100 Hz (4% ripple). The dotted line curve 210 represents the estimated voltage $\widehat{V_{PV_i}}$ calculated by the first estimator 80. The dotted line curve 220 represents the voltage recovered by the main controller 50 via the communication bus 52. The update is performed at the refresh frequency $f_D$, and between two updates, in the absence of information, the voltage is assumed to be constant. The curve 220 clearly shows the lack of information available to the main controller 50 for performing the regulation algorithm thereof. The waveform of the curve 210 thus reflects, much better than the curve 220, the actual voltage according to the curve 200. As a result, the voltage regulation of the photovoltaic units 20 is considerably improved.

FIG. 7 shows the change of the current of a conversion module 35 at the start (the continuous line curve 250), and the average current value constructed using the second estimator 85 (the dashed line curve 260). In other words, the curve 250 corresponds to the real value of the elementary input current $I_{PV_i}$, and the curve 260 corresponds to the estimated average of the elementary input current $I_{PV_i}$. FIG. 7 then shows the capacity of the second estimator 85 to recover the information quickly (with a grid delay period) and to stabilize in a steady state. This information, obtained simply by calculation and without measurement, can thus be used for calculating the estimated value $\widehat{V_{PV_i}}(t_k)$ of the elementary DC input voltage $V_{PV_i}$ via the first estimator 80.

FIG. 8 shows in a continuous line, a curve 300 representing the real voltage of a photovoltaic unit 20 over a grid period. Herein, the real value of the capacitance $C_{PV_i}$ of the capacitor 64 is 20% lower than the value taken into account in equation (1). In dotted lines, in the upper part of FIG. 8, a curve 310 represents the estimated value $\widehat{V_{PV_i}}(t_k)$ of the elementary DC input voltage $V_{PV_i}$ using a predefined value of the capacitance $C_{PV_i}$ of the capacitor 64, such as the value supplied by the manufacturer of the capacitor 64, i.e. without taking into account the estimated value $\widehat{C_{PV_i}}$ of the capacitance $C_{PV_i}$ of the capacitor 64 calculated by the third estimator 90. The curve 310 then shows some errors of estimation for the voltage of the elementary DC input voltage $V_{PV_i}$ with respect to curve 300 representing the real voltage. In dotted lines, in the lower part of FIG. 8, a curve 320 represents the estimated value $\widehat{V_{PV_i}}(t_k)$ of the elementary DC input voltage $V_{PV_i}$ using the estimated value $\widehat{C_{PV_i}}$ of the capacitance $C_{PV_i}$ of the capacitor 64 calculated by the third estimator 90. The curve 320 obtained by using both the first estimator 80 and the third estimator 90 is then much closer to the curve 300 representing the real voltage than was the curve 310 obtained without using the third estimator 90.

The skilled person would then observe that the third estimator 90 further improves the estimation of the elementary DC input voltage $V_{PV_i}$, by reducing the estimation errors, as is apparent from the comparison of the curves 310 and 320.

Figure 9:
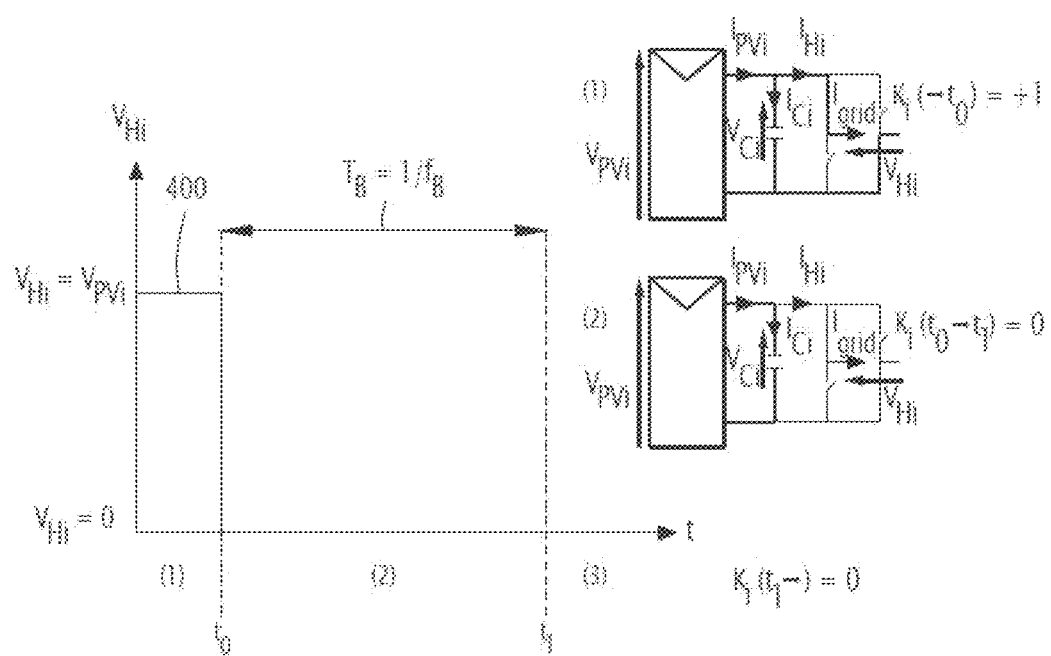
FIG. 9 is a schematic view illustrating the execution of an disconnection order for a respective conversion module, received from the main controller.
Figure 10:
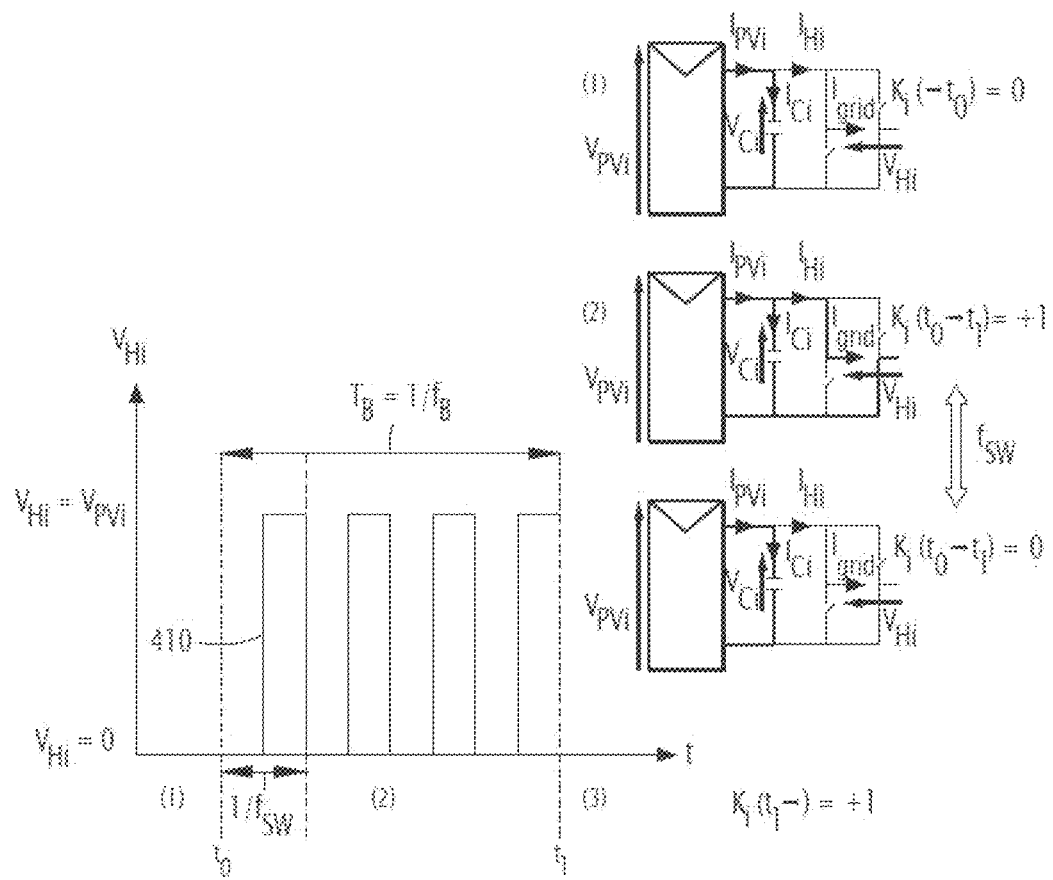
FIG. 10 is a schematic view illustrating the execution of a connection order of a respective conversion module, received from the main controller.

According to a supplementary aspect, FIGS. 9 and 10 illustrate the case where the loop frequency $f_B$ is different from the switching frequency $f_{sw}$ of the switches 38 of the conversion module 35.

The calculation of the regulation loop is carried out by the regulation unit REG at the loop frequency $f_B$. The regulation loop sends, at each regulation period $T_B$, with $T_B=1/f_B$, commands to change state to at most half of the conversion modules 35, or to a maximum of six conversion modules 35 if the number of conversion modules 35 is less than 12, so as to limit the number of switchings (to limit losses) and limit the number of commands to be sent (so as not to saturate the communication bus 52).

Advantageously, the number of conversion modules 35 which receive a command to change state at each regulation period $T_B$ is less than one quarter of the conversion modules 35, or less than 4 conversion modules 35.

In an optimum case, only two maximum conversion modules 35 receive commands to change state at each regulation period $T_B$. Such is the case described hereinafter.

At each regulation period $T_B$, either no command is sent (maintaining the preceding state), or a single command is sent to a single conversion module 35, or two commands are sent to two different conversion modules 35; meaning e.g.:
  a command to connect the module i (only one command)
  a command to disconnect the module j (only one command)
  a command to connect the module i and command to disconnect the module j (two commands)

The central controller 50 knows, in real time, the connection state of each conversion module 35. Same can thus send a connection command only to one conversion module 35 being disconnected, and a disconnection command only to one conversion module 35 being connected.

For the module i which has to execute a command, the central controller 50 sends a data $K_{M_i}$ such as:

$$-1 < K_{M_i} < 1 \quad [6]$$

FIG. 9 then illustrates the case of a disconnection command, and the curve 400 represents the elementary output voltage $V_{H_i}$, i.e. the voltage at the output of the switching bridge 58, during the execution of the disconnection command.

When $K_{M_i}(t_0)=0$, the module i directly places the switching bridge 58 in bypass mode:

$$K_i(t_0 \to t_0 + T_{boucle}) = 0 \quad [7]$$

Hence, the output voltage $V_{H_i}(t)$ of the converter module 35 over the period $[t_0 \to t_0+T_B]$ is:

$$V_{H_i}(t_0 \to t_0 + T_B) = V_{PV_i}(t) * K_i(t_0 \to t_0 + T_B) = 0 \quad [8]$$

Once the regulation period $[t_0 \to t_0+T_B]$ has ended, the module i awaits to receive a new command from the central controller 50 so as to change state again (which can last one to several regulation periods $T_B$).

In FIG. 9, the sequence of a disconnection command is then as follows.

For $t<t_0$, the conversion module 35 is connected:

$$V_{H_i}(\to t_0) = V_{PV_i} \quad [9]$$

At $t=t_0$, the module i receives the command $K_{M_i}=0$. The conversion module 35 goes directly into bypass mode:

$$V_{H_i}(t_0 \to t_1) = V_{H_i}(t_0 \to t_0 + T_B) = 0 \quad [10]$$

A $t=t_1$, if the conversion module 35 receives a new command $K_{M_i}$, same executes the command. Otherwise, the module maintains the current state thereof until the arrival of a new command:

$$V_{H_i}(t_1 \to) = 0 \quad [11]$$

FIG. 10 then illustrates the case of a connection command, and the curve 410 represents the elementary output voltage $V_{H_i}$, i.e. the voltage at the output of the switching bridge 58, during the execution of the connection command.

When $K_{M_j}(t_0) \neq 0$, the module j will switch the switching bridge 58 to the switching frequency $f_{sw}$ (an integer multiple of the loop frequency $f_B$) in order to obtain:

$$K_{M_j}(t_0) = \frac{1}{T_B} \int_{t_0}^{t_0+T_B} K_j(t) \cdot dt \quad [12]$$

When $K_{M_j}(t_0)>0$, the switching of the switching bridge 58 of the module j at the switching frequency $f_{sw}$ satisfies:

$$K_j(t_0 \to t_0 + T_B) \geq 0 \quad [13]$$

Hence, the output voltage of the converter module 35 over the period $[t_0 \to t_0+T_B]$ is:

$$V_{H_i}(t_0 \to t_0 + T_B) = V_{PV_i}(t) * K_i(t_0 \to t_0 + T_B) \geq 0 \quad [14]$$

When $K_{M_j}(t_0)<0$, the switching of the switching bridge 58 of the module j at the switching frequency $f_{sw}$ satisfies:

$$K_j(t_0 \to t_0 + T_B) \leq 0 \quad [15]$$

Hence, the output voltage of the converter module 35 over the period $[t_0 \to t_0+T_B]$ is:

$$V_{H_i}(t_0 \to t_0 + T_B) = V_{PV_i}(t) * K_i(t_0 \to t_0 + T_B) \leq 0 \quad [16]$$

In FIG. 10, the sequence of a connection command is then as follows.

For t<$t_0$, the conversion module 35 is disconnected:

$$V_{H_i}(\rightarrow t_0) = 0 \quad [17]$$

At t=$t_0$, the module i receives the command $K_{M_i}$=+0.5. The conversion module 35 will then switch during the period [$t_0 \rightarrow t_0+T_B$] to the switching frequency $f_{sw}$ (herein $f_{sw}$=4*$f_B$) with a duty cycle of 0.5, in order to satisfy the condition:

$$K_{M_i}(t_0) = 0.5 = \frac{1}{T_B} \int_{t_0}^{t_0+T_B} K_i(t) \cdot dt \quad [18]$$

A t=$t_1$, if the conversion module 35 receives a new command $K_{M_i}$, same executes the command. Otherwise, the module maintains the current state thereof until the arrival of a new command: $V_{H_i}(t_1 \rightarrow)=V_{PV_i}$.

The final state is a static state, i.e. a configuration which is maintained (applicable also to the case of conversion modules 35 switchable in series/parallel according to the example of FIG. 3), this configuration being maintained until reception of a new command. This final configuration (at t1+) is different from the initial configuration (at t0−), in a static configuration which gives a value of K close to $K_{M_i}(t_0)$. The static values of K of the initial and final configurations typically encompass the value $K_{M_i}(t_0)$.

Thereby, only the conversion modules 35 receiving a command, herein 2 conversion modules 35 at most, can have switchings at the switching frequency $f_{sw}$ for a period $T_B$, all the other conversion modules 35 remaining in the static state. Of course, a conversion module 35 can receive a plurality of commands in a row, and switch over a plurality of periods $T_B$, but, nevertheless, there will be herein at most two conversion modules 35 switching at the same time at the switching frequency $f_{sw}$.

For a connection command such as $K_{M_i}$<0, the reasoning is similar, with the difference that when the conversion module 35 switches ($K_i(t) \neq 0$) the voltage is negative:

$$V_{H_i}(t) = -V_{PV_i}(t).$$

The switching frequency $f_{sw}$ is an integer multiple of the loop frequency $f_B$, the multiple being greater than or equal to 1. The increase of the switching frequency $f_{sw}$ makes it possible to reduce the size of the passive components of the output filter 16. Moreover, the increase of the loop frequency $f_B$ improves the accuracy (limit the tracking error, the overshoot, the oscillations, etc.) of the regulation of the variables of the system: the elementary DC input voltages $V_{PVi}$ and the output current $I_S$, corresponding to the grid current $I_G$. Thus, it is nevertheless preferable to keep a loop frequency $f_B$ high compared with the frequency $f_G$ of the electrical grid 6 (at least >10 times), with e.g. the loop frequency $f_B$ on the order of 20 KHz.

Figure 11:
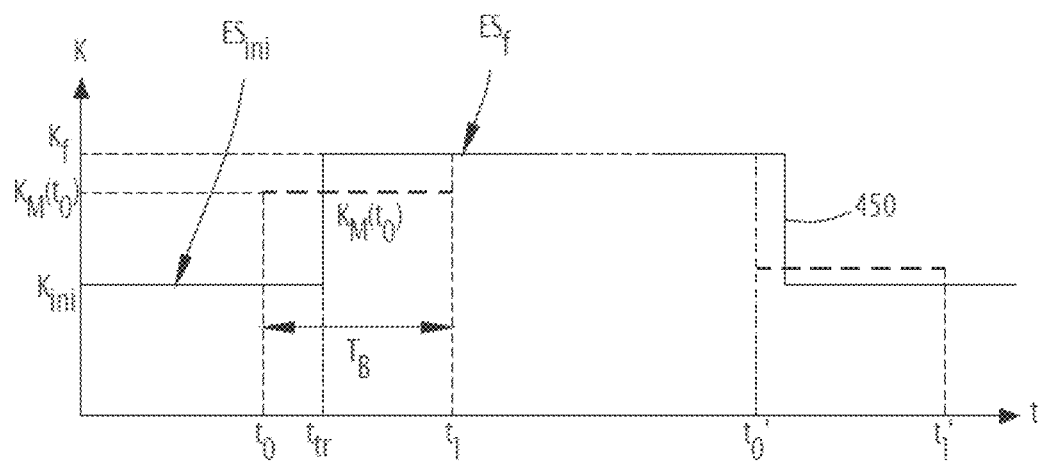
FIG. 11 is a schematic view illustrating the execution of a connection order of a respective conversion module, in the particular case where the frequency at which the calculations of the control unit included in the main controller are carried out is substantially equal to a switching frequency of the switches of said conversion module.

FIG. 11 then illustrates the case where the loop frequency $f_B$ is substantially equal to the switching frequency $f_{sw}$ of the switches 38 of the conversion module 35. The curve 450 represents the evolution of the connection coefficient K as a function of time t.

Even if the switching frequency $f_{sw}$ is substantially equal to the loop frequency $f_B$, it is possible to apply a $K_{M_j}(t_0)$ different from a static state.

In the example shown in FIG. 3 with series/parallel configurations, taking e.g. an initial K equal to +½ (initial configuration "Parallel+Positive polarity"), a $K_{final}$ equal to +1 (final configuration "Series+Positive polarity") and an $K_{M_j}(t_0)$ equal to 0.85, the conversion module 35 should thus change from the initial state to the final state during the period $T_B$ which goes from t0 to t1, in order to obtain the $K_{M_j}(t_0)$ desired during said period, the instant of transition from the initial state to the final state is determined such that the average value of K over said period is equal to $K_{M_j}(t_0)$.

The principle is thus similar to the case where the switching frequency $f_{sw}$ is greater than the loop frequency $f_B$. The change from an initial static state $ES_{ini}$ to a final static state $ES_f$ different from the initial static state $ES_{ini}$ takes place while ensuring a certain average value of the connection coefficient K over the transition period $T_B$. Finally, the final state is maintained as long as the conversion module 35 does not receive any new command.

Thereby, by limiting the number of conversion modules 35 receiving a command at each period $T_B$, the number of switchings is limited, and hence the quantity of commands to be sent on the communication bus 52 is limited as well.

In the examples shown in FIGS. 1 to 8, the loop frequency $f_B$ and the switching frequency $f_{sw}$ of the switches 38 are preferentially assumed to be similar, i.e. of substantially equal values, such as values on the order of 20 KHz.

Figure 12:
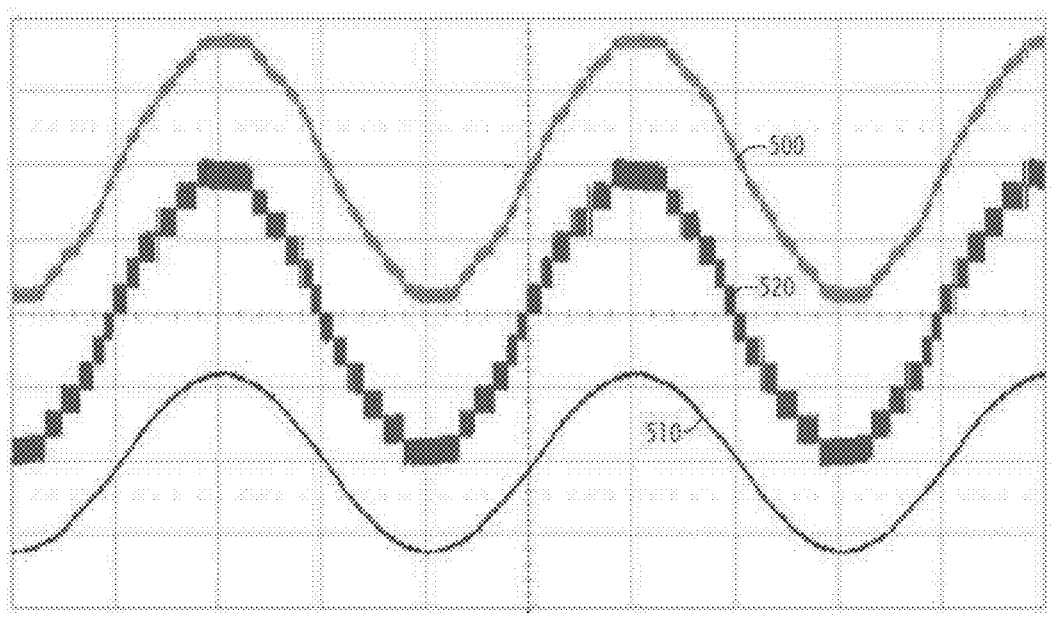
FIG. 12 is a view with three curves associated with the output of the energy converter, representing, correspondingly, the voltage of an electrical grid to which the output of the converter is connected, the total output voltage delivered by the converter, and the current of the electrical grid.

Finally, FIG. 12 shows the experimental results obtained using a prototype comprising six conversion modules 35 and operating at 20 KHz. Each conversion module 35 is connected to a photovoltaic unit 20 (such as a solar panel) of 50 W, and the total output power is 300 W. The converter 10 is connected to the electric grid 6 the voltage of which is lowered (by means of an autotransformer (not shown)) up to a value on the order of 90 V. In FIG. 12, the curve 500 corresponds to the voltage $V_G$ of the electrical grid 6, the curve 510 corresponds to the current $I_G$ of the electrical grid 6, and the curve 520 corresponds to the voltage $V_S$ at the output of the converter 10.

The curves 500, 510, 520 are given in steady state. FIG. 12 then shows that the converter 10 perfectly manages to produce a sinusoidal output current $I_G$, in phase with the voltage $V_G$ of the electrical grid 6 with very good regulation dynamics (low harmonic distortion frequency and unit power factor), with an operation frequency of 20 kHz, while stabilizing each conversion module 35 around the point of maximum power thereof. The oscillations on the output current $I_G$ and on the voltages of the photovoltaic units 20 correspond perfectly to the oscillations expected by the dimensioning calculations of the passive elements. By means of the control device 15 according to the invention, the constraints of the communication bus 52 thus have no impact on the operation of the conversion system 5.

It should thereby be understood that the device 15 for controlling the multi-level energy converter 10 according to the invention leads to a high frequency control, typically greater than 20 kHz, of said converter 10 which can also be connected to a large number of sources of energy 8, e.g. to more than ten sources of energy 8, while limiting the bit rate of the data bus 52 and reducing the complexity of the control device 15, as well as the size and the volume of the filtering elements at the output, such as the filter 16.

What is claimed is:

1. An electronic control device for controlling an electric energy converter, the energy converter being apt to deliver a total output voltage and/or an output current from a plurality of DC input voltages, called elementary DC input voltages, each coming from a respective source of energy; the energy converter comprising a plurality of energy conversion modules, each being apt to receive as input an elementary DC input voltage from a respective source of energy and to deliver as output an elementary output voltage; the converter modules being connected in series by the outputs thereof and the total output voltage being equal to the sum of the elementary output voltages; each conversion module including a plurality of switches for converting the respective elementary DC input voltage into the respective output elementary voltage, the electronic control device comprising a plurality of elementary controllers and a main controller connected to each of the elementary controllers, each elementary controller being associated with a respective conversion module and configured to control the switches of said conversion module, the main controller being configured to regulate an output variable of the energy converter by sending control commands to the elementary controllers, the regulation being carried out based on sets of elementary variable(s), each set of elementary variable(s) being associated with a respective conversion module, each elementary controller being configured to regularly measure values of the set of elementary variable(s) for the respective conversion module with which it is associated, and then to transmit them to the main controller, the set of elementary variable(s) including the elementary DC input voltage, wherein the main controller includes a first estimator configured to calculate, for each conversion module, an estimated value of the elementary DC input voltage from a previously measured value of the elementary DC input voltage, and wherein the main controller further comprises a second estimator configured to calculate, for each conversion module, an estimated average of the input elementary current received by the conversion module, the estimated value of the elementary input current being then used for calculating the estimated value of the elementary DC input voltage.

2. The device according to claim 1, wherein each conversion module comprises two input terminals, two output terminals, a switching bridge with a plurality of switching branches, each connected between the two input terminals and including a plurality of switches connected in series and connected to each other at a midpoint connected to a corresponding output terminal, each conversion module further comprising a capacitor connected between the input terminals, in parallel with the switching bridge.

3. The device according to claim 2, wherein the first estimator is configured to calculate, for each conversion module, the estimated value of the elementary DC input voltage as a function of the previously measured value the elementary DC input voltage, the capacitance of the capacitor and a value of the current flowing through said capacitor.

4. The device according to claim 3, wherein the value of the current flowing through said capacitor is obtained by the difference between a value of an input elementary current received by the conversion module and a value of a bridge current received by the switching bridge.

5. The device according to claim 3, wherein the first estimator is configured to calculate, for each conversion module, the estimated value of the elementary DC input voltage according to the following equation:

$$\widehat{V_{PV_i}}(t_k) = V_{PV_i}(t_{k-1}) + \left(I_{PV_i}(t_k) - I_{H_i\_M}(t_k)\right) \cdot \frac{t_k - t_{k-1}}{C_{PV_i}}$$

where $\widehat{V_{PV_i}}(t_k)$ is the estimated value of the elementary DC input voltage, $V_{PVi}(t_{k-1})$ represents a preceding value of the elementary DC input voltage, $I_{PVi}(t_k)$ is the value of the input elementary current, $t_k$, and $t_{k-1}$, respectively, represent current and preceding, respectively, instants, where $C_{PVi}$ represents the capacitance of the capacitor, $I_{Hi\_M}(t_k)$ represents the average value of the bridge current between the instants $t_{k-1}$ and $t_k$;

the preceding value of the elementary DC input voltage being the previously measured value of the elementary DC input voltage if same was measured for the preceding instant, or the preceding estimated value of the elementary DC input voltage if said previously measured value was measured for an instant prior to the preceding instant.

6. The device according to claim 5, wherein said average value of the bridge current satisfies the following equation:

$$I_{H_i\_M}(t_k) = \frac{1}{t_k - t_{k-1}} \int_{t_{k-1}}^{t_k} I_{H_i}(t) \cdot dt.$$

7. The device according to claim 1, wherein the second estimator is configured to calculate the estimated average of the input elementary current received by a respective conversion module, in the absence of measurement of the input elementary current by a current sensor for said conversion module.

8. The device according to claim 1, wherein the second estimator is configured to calculate, for each conversion module, the estimated average of the input elementary current over a period of averaging, as a function of the total output voltage and an output current delivered at the output of the energy converter, and of an average value of the elementary DC input voltage over the period of averaging.

9. The device according to claim 8, wherein the period of averaging depends on a half-period of the output voltage.

10. The device according to claim 8, wherein the second estimator is configured to calculate, for each conversion module, the estimated value of the input elementary current according to the following equation:

$$<I_{PV_i}> = \frac{1}{T_g} \cdot \frac{\int_{t_0}^{t_0+T_g} V_S(t) \cdot I_S(t) \cdot |K_i(t)| \, dt}{<V_{PV_i}>}$$

where $<I_{PVi}>$ is the estimated average of the input elementary current, $T_g$ represents the period of averaging, $V_S$ is the total output voltage, $I_S$ is the output current, $<V_{PVi}>$ represents the average value of the elementary DC input voltage over said period of averaging, and $K_i$ represents a connection coefficient, $K_i$ being equal to 0 when no source of energy is connected to the input of the corresponding conversion module and different from 0 when at least one source of energy is connected to the input of the corresponding conversion module.

11. The device according to claim 10, wherein the period of averaging is a multiple of the half-period of the output voltage, said multiple being an integer with a value greater than or equal to 1.

12. The device according to claim 2, wherein the main controller further includes a third estimator configured to calculate, for each conversion module, an estimated value of the capacitance of the capacitor.

13. The device according to claim 12, wherein the third estimator is configured to estimate a current value of the capacitance of the capacitor by correcting a preceding estimated value of the capacitance of the capacitor based, on the one hand, on the sign of the difference between a value of a bridge current received by the switching bridge and a value of an elementary input current received by the conversion module, called the first sign; and, on the other hand, on the sign of the difference between the estimated value of the elementary DC input voltage and the subsequently measured value) of the elementary DC input voltage, called the second sign; an initial estimated value of the capacitance of the capacitor being predefined.

14. The device according to claim 13, wherein if the first and second signs are identical, the current estimated value of the capacitance of the capacitor is equal to the preceding estimated value of the capacitance of the capacitor minus a correction step; and
wherein if the first and second signs are distinct, the current estimated value of the capacitance of the capacitor is equal to the preceding estimated value of the capacitance of the capacitor plus the correction step.

15. The device according to claim 13, wherein the correction step is on the order of one percent of the initial value of the capacitance of the capacitor.

16. The device according to claim 1, wherein each source of energy includes at least one element selected from: a photovoltaic unit, an electric battery and a supercapacitor.

17. The device according to claim 16, wherein each source of energy comprises P pair(s) of photovoltaic units, the photovoltaic units of a respective pair being connected in cascade, P being an integer greater than or equal to 1.

18. The device according to claim 17, wherein if P is strictly greater than 1, the pairs of photovoltaic units are connected in cascade.

19. A device according to claim 10, wherein each conversion module comprises two input terminals, two output terminals, a switching bridge with a plurality of switching branches, each connected between the two input terminals and including a plurality of switches connected in series and connected to each other at a midpoint connected to a corresponding output terminal, each conversion module further comprising a capacitor connected between the input terminals, in parallel with the switching bridge,
wherein each source of energy includes at least one element selected from: a photovoltaic unit, an electric battery and a supercapacitor,
wherein each conversion module comprises Q capacitors, where Q, equal to twice the number P, represents the number of photovoltaic units for the source of energy associated with the conversion module, each capacitor being apt to be connected in parallel with a respective photovoltaic unit, the Q capacitors having a substantially identical capacitance, and
wherein when the connection coefficient is non-zero, the value thereof is a multiple of 1/Q, the multiple being a relative integer the value of which depends on a connection configuration of the photovoltaic units and on a connection state of each of the photovoltaic units, each connection state being among connected and disconnected.

20. An electronic electrical energy conversion system apt to convert a plurality of input DC voltages into a total output voltage and/or an output current, the conversion system comprising:
an energy converter apt to deliver the total output voltage and/or the output current from the plurality of input DC voltages, called elementary input DC voltages, each coming from a respective source of energy; the energy converter comprising a plurality of energy conversion modules, each being apt to receive as input an elementary DC input voltage from a respective source of energy and to deliver as output an elementary output voltage; the converter modules being connected in series by the outputs thereof and the total output voltage being equal to the sum of the elementary output voltages; each conversion module including a plurality of switches for converting the respective elementary DC input voltage into the respective output elementary voltage,
an electronic device for controlling the electric energy converter,
wherein the electronic control device is according to claim 1.

21. A method for controlling an electric energy converter, the energy converter being apt to deliver a total output voltage and/or an output current from a plurality of DC input voltages, called elementary DC input voltages, each coming from a respective source of energy; the energy converter comprising a plurality of energy conversion modules, each being apt to receive as input an elementary DC input voltage from a respective source of energy and to deliver as output an elementary output voltage; the converter modules being connected in series by the outputs thereof and the total output voltage being equal to the sum of the elementary output voltages; each conversion module including a plurality of switches for converting the respective elementary DC input voltage into the respective output elementary voltage,
the control method being implemented by a main controller connected to each of a plurality of elementary controllers, each elementary controller being associated with a respective conversion module and configured to control the switches of said conversion module, the method comprising:
regulating an output variable of the energy converter by sending control commands to the elementary controllers, the regulation being carried out according to sets of elementary variable(s), each set of elementary variable(s) being associated with a respective conversion module, each elementary controller regularly measuring values of the set of elementary variable(s) for the respective conversion module with which same is associated and then transmitting same to the main controller, the set of elementary variable(s) including the elementary DC input voltage,
calculating, for each conversion module, an estimated value of the elementary DC input voltage from a previously measured value of the elementary DC input voltage, and
calculating, for each conversion module, an estimated average of the input elementary current received by the conversion module, the estimated value of the elementary input current being then used for calculating the estimated value of the elementary DC input voltage.

22. A non-transitory computer-readable medium including a computer program comprising software instructions which, when executed by a computer, implement a method according to claim 21.

\* \* \* \* \*